(12) United States Patent
Nagamori et al.

(10) Patent No.: US 8,362,121 B2
(45) Date of Patent: Jan. 29, 2013

(54) CROSSLINKABLE RUBBER COMPOSITION AND CROSS-LINKED RUBBER

(75) Inventors: Hiroyasu Nagamori, Yokohama (JP);
Shigeru Fujita, Yokohama (JP);
Kiyonori Umetsu, Yokohama (JP);
Akira Tsukada, Ichikawa (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 13/412,327

(22) Filed: Mar. 5, 2012

(65) Prior Publication Data
US 2012/0172509 A1 Jul. 5, 2012

Related U.S. Application Data

(62) Division of application No. 12/086,767, filed as application No. PCT/JP2006/325475 on Dec. 21, 2006, now Pat. No. 8,153,712.

(30) Foreign Application Priority Data

Dec. 21, 2005 (JP) ................... 2005-368202
Jan. 31, 2006 (JP) ................... 2006-023726
Feb. 22, 2006 (JP) ................... 2006-045259
Mar. 10, 2006 (JP) ................... 2006-066665

(51) Int. Cl.
*C08K 5/521* (2006.01)
*C08K 5/17* (2006.01)
*C08L 55/00* (2006.01)

(52) U.S. Cl. ............... 524/145; 524/186; 524/565

(58) Field of Classification Search .......... 524/145
See application file for complete search history.

(56) References Cited

U.S. PATENT DOCUMENTS

| | | | |
|---|---|---|---|
| 3,758,519 A | 9/1973 | Wheeler | |
| 6,489,385 B1 | 12/2002 | Fujii et al. | |
| 6,657,014 B1 * | 12/2003 | Mori et al. | 525/329.3 |
| 7,176,263 B2 | 2/2007 | Aimura et al. | |
| 2005/0250913 A1 | 11/2005 | Masuda et al. | |
| 2006/0167159 A1 | 7/2006 | Kubota et al. | |
| 2007/0037930 A1 | 2/2007 | Odagawa et al. | |
| 2009/0005512 A1 | 1/2009 | Masuda et al. | |

FOREIGN PATENT DOCUMENTS

| | | |
|---|---|---|
| CN | 1656168 A | 8/2005 |
| EP | 1 234 851 A1 | 8/2002 |
| EP | 1 533 326 A1 | 5/2005 |
| EP | 1 535 962 A1 | 6/2005 |
| EP | 1 550 694 A1 | 7/2005 |
| EP | 1 672 016 A1 | 6/2006 |
| JP | 6-136183 A | 5/1994 |
| JP | 10-279734 A | 10/1998 |
| JP | 2001-55471 A | 2/2001 |
| WO | WO 97/36956 A1 | 10/1997 |
| WO | WO 2005/030859 A1 | 4/2005 |

OTHER PUBLICATIONS

Advisory Action dated Mar. 11, 2011 for U.S. Appl. No. 12/086,767.
European Search Report mailed Feb. 7, 2011 for Application No. 06842923.6.
International Search Report mailed Apr. 10, 2007 for International Application No. PCT/JP2006/325475.
Notice of Allowability dated Dec. 5, 2011, for U.S. Appl. No. 12/086,767.
Office Action dated Dec. 30, 2010 for U.S. Appl. No. 12/086,767.
Office Action dated Jun. 30, 2011 for U.S. Appl. No. 12/086,767.
Office Action dated Sep. 9, 2010 for U.S. Appl. No. 12/086,767.
Written Opinion of the Internationl Searching Authority dated Jun. 24, 2008 for International Application No. PCT/JP2006/325475.

* cited by examiner

*Primary Examiner* — Vu A Nguyen
(74) *Attorney, Agent, or Firm* — Birch, Stewart, Kolasch & Birch, LLP

(57) ABSTRACT

A crosslinkable rubber composition comprising 0.2 to 10 parts by weight of an aromatic secondary amine-based anti-aging agent and 0.5 to 20 parts by weight of a polyamine-based crosslinking agent with respect to 100 parts by weight of a nitrile rubber including an $\alpha,\beta$-ethylenically unsaturated nitrile unit and an $\alpha,\beta$-ethylenically unsaturated dicarboxylic acid monoester unit, and with iodine value of 120 or less. The present invention can provide a crosslinkable rubber composition, providable of a cross-linked rubber excellent in a variety of properties such as mechanical strength and small in compression set, and a cross-linked rubber obtained by crosslinking the rubber composition.

5 Claims, No Drawings

CROSSLINKABLE RUBBER COMPOSITION AND CROSS-LINKED RUBBER

This application is a Divisional of, and claims the 35 U.S.C. 120 benefit of, application Ser. No. 12/086,767, filed Jun. 19, 2008, now U.S. Pat. No. 8,153,712 which is the National Phase of International Application No. PCT/JP2006/325475, filed on Dec. 21, 2006. This application claims the 35 U.S.C. 119 benefit of Japanese Applications: 2006-066665, filed Mar. 10, 2006; 2006-045259, filed Feb. 22, 2006; 2006-023726, filed Jan. 31, 2006; and 2005-368202, filed Dec. 21, 2005. The entire contents of the above applications are hereby incorporated by reference into the present application.

FIELD OF THE INVENTION

The present invention relates to a crosslinkable rubber composition, providable of a cross-linked article excellent in a variety of properties such as mechanical strength and small in compression set, and a cross-linked rubber obtained by cross-linking the rubber composition.

DESCRIPTION OF THE RELATED ART

As a rubber having oil resistance, heat resistance and ozone resistance, nitrile group containing highly-saturated copolymer rubber has been known, and the cross-linked rubber thereof has been used as a material for various automotive rubber products such as a belt, hose, gasket, packing and oil-seal. Recently, it has been required to further improve mechanical strength such as tensile strength and tensile stress, and particularly in a bulk rubber product other than a fiber impregnated body or metal composite body, compression set has been required to improve as well as mechanical strength such as tensile strength.

In response to this, a crosslinkable rubber composition comprising a nitrile group containing highly-saturated copolymer rubber including α,β-ethylenically unsaturated dicarboxylic acid monoalkyl ester units, a polyamine-based crosslinking agent and a basic crosslinking accelerator has been proposed (Patent Article 1). By crosslinking the composition, there can be provided a cross-linked rubber having improved tensile strength, tensile stress and compression set. However, for example, in a cross-linked rubber with a structure surrounding a space portion such as O-ring, compression set tends to increase due to an influence of force at compression, so that further improvement in compression set has been required.

Also, to improve compression set while keeping heat aging resistance favorably, for example, there have been proposed a method to blend silica-based inorganic compounding ingredient with pH of 8.5 or more and vinylsilane-based coupling agent (Patent Article 2), and a method to blend additives selected from a group including strong base, a salt of strong base and weak acid, carbodiimide, polycarbodiimide and a mixture thereof (Patent Article 3), etc. However, even in the Patent Articles 2 and 3, improvement effect in compression set is insufficient, and further improvement has yet been required in compression set.

Patent Article 1: The Japanese Unexamined Patent Publication 2001-55471;
Patent Article 2: The Japanese Unexamined Patent Publication S62-240338
Patent Article 3: The Japanese Unexamined Patent Publication H11-293039.

DISCLOSURE OF INVENTION

Problem to be Solved by the Invention

An object of the present invention is to provide a crosslinkable rubber composition, providable of a cross-linked rubber with particularly small compression set while well-maintaining a variety of properties such as mechanical strength, and a cross-linked rubber obtained by cross-linking the rubber composition.

Means for Solving the Problem

The present inventors found, as a result of keen examinations, that it is possible to attain the above purpose by a certain crosslinkable rubber composition including a specific nitrile rubber and a polyamine-based crosslinking agent as a crosslinking agent, and came to complete the present invention based on the findings.

Namely, according to a first aspect of the present invention, there is provided a crosslinkable rubber composition comprising 0.2 to 10 parts by weight of an aromatic secondary amine-based anti-aging agent (A2) and 0.2 to 20 parts by weight of a polyamine-based crosslinking agent (A3) with respect to 100 parts by weight of a nitrile rubber (A1) including an α,β-ethylenically unsaturated nitrile monomer unit and an α,β-ethylenically unsaturated dicarboxylic acid monoester monomer unit and having iodine value of 120 or less.

In the first aspect, preferably, a monomer forming said α,β-ethylenically unsaturated dicarboxylic acid monoester monomer unit is a monoester monomer of a dicarboxylic acid containing a carboxyl group in each of two carbon atoms forming an α,β-ethylenically unsaturated bond.

In the first aspect, preferably, compound Mooney viscosity $ML_{1+4}$ (100° C.) of said crosslinkable rubber composition is 15 to 200.

In the first aspect, preferably, said crosslinkable rubber composition provides a cross-linked rubber, wherein O-ring compression set is 71% or less after maintaining the cross-linked rubber in a 25%-compressed state at 150° C. for 504 hours.

Alternatively, according to a second aspect of the present invention, there is provided a crosslinkable rubber composition comprising 0.1 to 20 parts by weight of a primary monoamine (B2) having no polar group other than an amino group and 0.1 to 20 parts by weight of a polyamine-based crosslinking agent (B3) with respect to 100 parts by weight of a nitrile rubber (B1) including an α,β-ethylenically unsaturated nitrile monomer unit and an α,β-ethylenically unsaturated dicarboxylic acid monoester monomer unit and having iodine value of 120 or less.

In the second aspect, preferably, said primary monoamine (B2) having no polar group other than an amino group is an aliphatic primary monoamine.

Alternatively, according to a third aspect of the present invention, there is provided a crosslinkable rubber composition comprising a nitrile group containing highly-saturated copolymer rubber (C1), a polyoxyalkylene alkyl ether phosphate ester (C2) and a polyamine-based crosslinking agent (C3).

In the third aspect, preferably, said nitrile group containing highly-saturated copolymer rubber (C1) is a nitrile rubber in which a content of α,β-ethylenically unsaturated nitrile monomer units is 10 to 60 wt % and iodine value is 100 or less.

Alternatively, according to a fourth aspect of the present invention, there is provided a crosslinkable rubber composition comprising 0.2 to 20 parts by weight of a polyamine-based crosslinking agent (D3) with respect to a total of 100 parts by weight of a nitrile group containing highly-saturated copolymer rubber (D1) having an α,β-ethylenically unsaturated dicarboxylic acid monoester monomer unit and an acrylic rubber (D2) having an α,β-ethylenically unsaturated dicarboxylic acid monoester monomer unit.

In the fourth aspect, preferably, a monomer forming said α,β-ethylenically unsaturated dicarboxylic acid monoester monomer unit is a monoester monomer of a dicarboxylic acid having a carboxyl group in each of two carbon atoms forming an α,β-ethylenically unsaturated bond, and more preferably, a monomer having an alkoxy group with carbon number of 3 to 8.

In the fourth aspect, preferably, a weight ratio of said nitrile group containing highly-saturated copolymer rubber (D1) and said acrylic rubber (D2) is 5/95 to 95/5.

In the fourth aspect, preferably, said crosslinkable rubber composition provides a cross-linked rubber, wherein O-ring compression set is 40% or less after maintaining the cross-linked rubber in a 25%-compressed state at 150° C. for 168 hours.

In the fourth aspect, preferably, said crosslinkable rubber composition further includes 0.5 to 10 parts by weight of a basic crosslinking accelerator (D4).

Also, the present invention provides a cross-linked rubber obtained by cross-linking the crosslinkable rubber composition according to any one of the above first to fourth aspects. The cross-linked rubber according to the present invention (the first to fourth aspects) is preferably used as a seal material or a belt material.

Effects of the Invention

According to the present invention, there can be provided a crosslinkable rubber composition, providable of a cross-linked rubber with particularly small compression set while well maintaining a variety of properties such as mechanical strength, and a cross-linked rubber obtained by cross-linking the rubber composition Particularly, according to the first aspect of the present invention, there can be provided a crosslinkable rubber composition, providable of a cross-linked rubber well-balanced in mechanical strength, such as tensile strength and tensile stress, and elongation and having particularly small compression set, and a cross-linked rubber obtained by cross-linking the rubber composition.

Also, according to the second aspect of the present invention, there can be provided a crosslinkable rubber composition, providable of a cross-linked rubber with small compression set, good in workability and excellent in scorch stability, and a cross-linked rubber obtained by cross-linking the rubber composition.

According to the third aspect of the present invention, there can be provided a crosslinkable rubber composition, providable of a cross-linked rubber excellent in heat aging resistance and having particularly small compression set, and a cross-linked rubber obtained by cross-linking the rubber composition.

Further, according to the fourth aspect of the present invention, there can be provided a crosslinkable rubber composition, providable of a cross-linked rubber excellent in mechanical strength and heat resistance and having significantly small compression set by using a nitrile group containing highly-saturated copolymer rubber, and a cross-linked rubber obtained by cross-linking the rubber composition.

BEST MODE FOR WORKING THE INVENTION

First Aspect

First Embodiment

First, an embodiment according to the first aspect of the present invention, i.e. a first embodiment, will be described.

The crosslinkable rubber composition according to the first aspect of the present invention comprises 0.2 to 10 parts by weight of an aromatic secondary amine-based anti-aging agent (A2) and 0.2 to 20 parts by weight of a polyamine-based crosslinking agent (A3) with respect to 100 parts by weight of a nitrile rubber (A1) including an α,β-ethylenically unsaturated nitrile monomer unit and an α,β-ethylenically unsaturated dicarboxylic acid monoester monomer unit and having iodine value of 120 or less.

Hereinafter, in the first aspect (first embodiment), the nitrile rubber (A1) comprising the above α,β-ethylenically unsaturated dicarboxylic acid monoester monomer unit and having iodine value of 120 or less may be abbreviated with "nitrile rubber (A1)".

Nitrile Rubber (A1)

The monomer forming the α,β-ethylenically unsaturated nitrile monomer unit of the nitrile rubber (A1) (α,β-ethylenically unsaturated nitrile monomer) is not limited as far as it is an α,β-ethylenically unsaturated compound having a nitrile group. As the compound, acrylonitrile; α-halogenoacrylonitrile such as α-chloroacrylonitrile and α-bromoacrylonitrile; α-alkylacrylonitrile such as methacrylonitrile; etc., can be mentioned. Among these, acrylonitrile and methacrylonitrile are preferable. As the α,β-ethylenically unsaturated nitrile, a plurality of these may be used.

A content of the α,β-ethylenically unsaturated nitrile monomer unit in the nitrile rubber (A1) is, preferably 10 to 60 wt %, more preferably 15 to 55 wt % and particularly preferably 20 to 50 wt %, per 100 wt % of the total monomer units. When the content of the α,β-ethylenically unsaturated nitrile monomer unit is too small, oil resistance of the obtained cross-linked rubber may decline; and in contrast, when it is too large, cold resistance may decline.

The nitrile rubber (A1) comprises the α,β-ethylenically unsaturated dicarboxylic acid monoester monomer unit in addition to the α,β-ethylenically unsaturated nitrile monomer unit. By making the constitution of the nitrile rubber (A1) comprising the α,β-ethylenically unsaturated dicarboxylic acid monoester monomer unit, tensile strength of the obtained cross-linked rubber tends to be improved.

A preferable method to include the α,β-ethylenically unsaturated dicarboxylic acid monoester monomer unit in the nitrile rubber (A1) may include a method to copolymerize the α,β-ethylenically unsaturated dicarboxylic acid monoester with the above α,β-ethylenically unsaturated nitrile.

As an organic group binding to a carbonyl group through an oxygen atom of the α,β-ethylenically unsaturated dicarboxylic acid monoester, an alkyl group, cycloalkyl group and alkylcycloalkyl group may be mentioned, and the alkyl group is preferable among them. Carbon number of the alkyl group is preferably 1 to 10, more preferably 2 to 6. Carbon number of the cycloalkyl group is preferably 5 to 12, more preferably 6 to 10. Carbon number of the alkylcycloalkyl group is preferably 6 to 12, more preferably 7 to 10. When carbon number of the organic group is too small, processing stability of the obtained rubber composition may decline; and in contrast, when it is too large, cross-linking rate may slow down and mechanical strength of the cross-linked rubber may decline.

Examples of the α,β-ethylenically unsaturated dicarboxylic acid monoester monomer may include a maleate monoalkyl ester such as monomethyl maleate, monoethyl maleate, monopropyl maleate and mono-n-butyl maleate; a maleate monocycloalkyl ester such as monocyclopentyl maleate, monocyclohexyl maleate and monocycloheptyl maleate; a maleate monoalkylcycloalkyl ester such as monomethyl cyclopentyl maleate and monoethyl cyclohexyl maleate; a fumarate monoalkyl ester such as monomethyl fumarate, monoethylfumarate, monopropyl fumarate and mono-n-butyl fumarate; a fumarate monocycloalkyl ester such as monocyclopentyl fumarate, monocyclohexyl fumarate and monocycloheptyl fumarate; a fumarate monoalkylcycloalkyl ester such as monomethyl cyclopentyl fumarate and monoethyl cyclohexyl fumarate; a citraconic acid monoalkyl ester such as monomethyl citraconic acid, monoethyl citraconic acid, monopropyl citraconic acid and mono-n-butyl citraconic acid; a citraconic acid monocycloalkyl ester such as monocyclopentyl citraconic acid, monocyclohexyl citraconic acid and monocycloheptyl citraconic acid; a citraconic acid monoalkylcycloalkyl ester such as monomethyl cyclopentyl citraconic acid and monoethyl cyclohexyl citraconic acid; an itaconic acid monoalkyl ester such as monomethyl itaconate, monoethyl itaconate, monopropyl itaconate and mono-n-butyl itaconate; an itaconic acid monocycloalkyl ester such as monocyclopentyl itaconic acid, monocyclohexyl itaconic acid and monocycloheptyl itaconic acid; an itaconic acid monoalkylcycloalkyl ester such as monomethyl cyclopentyl itaconic acid and monoethyl cyclohexyl itaconic acid; etc.

Among these, because of their reduction effect of compound Mooney viscosity $ML_{1+4}$ (100° C.) of the crosslinkable rubber composition, a monoester (monoalkyl ester, monocycloalkyl ester and monoalkylcycloalkyl ester) of a dicarboxylic acid having a carboxyl group in each of two carbon atoms forming an α,β-ethylenically unsaturated bond, such as maleic acid, fumaric acid and citraconic acid, is preferable, and monoesters of maleic acid and fumaric acid are particularly preferable.

The content of the α,β-ethylenically unsaturated dicarboxylic acid monoester monomer unit in the nitrile rubber (A1) is preferably 0.5 to 20 wt %, more preferably 1 to 15 wt % and particularly preferably 1.5 to 10 wt % per 100 wt % of the total monomer units. When the content of the α,β-ethylenically unsaturated dicarboxylic acid monoester monomer unit of the nitrile rubber (A1) is too small, the cross-link of the crosslinkable rubber composition may be insufficient. On the other hand, when it is too large, carboxyl groups remaining after the cross-link may cause to reduce resistance to fatigue of the obtained cross-linked rubber.

The nitrile rubber (A1) normally comprises a diene-based monomer unit and/or α-olefin-based monomer unit in addition to the above α,β-ethylenically unsaturated nitrile monomer unit and α,β-ethylenically unsaturated dicarboxylic acid monoester monomer unit, so that the obtained cross-linked rubber can be elastic.

As the diene-based monomer forming the diene-based monomer unit, there may be mentioned a conjugated diene with carbon number of 4 or more such as 1,3-butadiene, isoprene, 2,3-dimethyl-1,3-butadiene and 1,3-pentadiene; a nonconjugated diene with carbon number of preferably 5 to 12 such as 1,4-pentadiene and 1,4-hexadiene; etc. Among these, the conjugated diene is preferable, and 1,3-butadiene is more preferable.

As the α-olefin-based monomer forming the α-olefin monomer unit, an α-olefin with carbon number of 2 to 12 may be preferable and there may be exemplified ethylene, propylene, 1-butene, 4-methyl-1-pentene, 1-hexene, 1-octene, etc.

A content of the diene-based monomer unit or α-olefin monomer unit in the nitrile rubber (A1) is preferably 25 to 85 wt %, more preferably 35 to 80 wt % and particularly preferably 45 to 75 wt % per 100 wt % of the total monomer units. When the content of the unit is too small, rubber elasticity of the obtained cross-linked rubber may decline; and when it is too large, heat resistance and chemical stability may be deteriorated.

The nitrile rubber (A1) may include other monomer units copolymerizable with each of the monomers forming the above monomer units, i.e. the α,β-ethylenically unsaturated nitrile monomer, α,β-ethylenically unsaturated dicarboxylic acid monoester monomer, and diene-based monomer or α-olefin monomer. As the other monomers, there may be exemplified an α,β-ethylenically unsaturated carboxylic acid ester other than the α,β-ethylenically unsaturated dicarboxylic acid monoester, an aromatic vinyl, a fluorine containing vinyl, an α,β-ethylenically unsaturated monocarboxylic acid, an α,β-ethylenically unsaturated polyvalent carboxylic acid, an α,β-ethylenically unsaturated polyvalent carboxylic anhydride, copolymerizable anti-aging agent, etc.

As the α,β-ethylenically unsaturated carboxylic acid ester other than the α,β-ethylenically unsaturated dicarboxylic acid monoester, for example, there may be mentioned an acrylic acid alkyl ester and methacrylic acid alkyl ester with carbon number of an alkyl group of 1 to 18 such as methyl acrylate, ethyl acrylate, propyl acrylate, butyl acrylate, n-dodecyl acrylate, methyl methacrylate and ethyl methacrylate; an acrylic acid alkoxyalkyl ester and methacrylic acid alkoxyalkyl ester with carbon number of an alkoxyalkyl group of 2 to 12 such as methoxymethyl acrylate and methoxyethyl methacrylate; an acrylic acid cyanoalkyl ester and methacrylic acid cyanoalkyl ester with carbon number of a cyanoalkyl group of 2 to 12 such as α-cyanoethyl acrylate, β-cyanoethyl acrylate and cyanobutyl methacrylate; an acrylic acid hydroxyalkyl ester and methacrylic acid hydroxyalkyl ester with carbon number of a hydroxyalkyl group of 1 to 12 such as 2-hydroxyethyl acrylate, 2-hydroxyethyl methacrylate and 3-hydroxypropyl acrylate; a fluorine-substituted benzyl group containing acrylic acid ester and fluorine-substituted benzyl group containing methacrylic acid ester such as fluorobenzyl acrylate and fluorobenzyl methacrylate; a fluoroalkyl group containing acrylic acid ester and fluoroalkyl group containing methacrylic acid ester such as trifluoroethyl acrylate and tetrafluoropropyl methacrylate; an unsaturated polyvalent carboxylic acid polyalkyl ester such as dimethyl maleate, dimethyl fumarate, dimethyl itaconate and diethyl itaconate; an amino group containing α,β-ethylenically unsaturated carboxylic acid ester such as dimethylaminomethyl acrylate and diethylaminoethyl acrylate; etc.

As the aromatic vinyl, styrene, α-methylstyrene, vinylpyridine, etc., may be mentioned.

As the fluorine containing vinyl, fluoroethylvinyl ether, fluoropropylvinyl ether, o-trifluoromethylstyrene, vinyl pentafluorobenzoate, difluoroethylene, tetrafluoroethylene, etc., may be mentioned.

As the α,β-ethylenically unsaturated monocarboxylic acid, acrylic acid, methacrylic acid, etc., may be mentioned.

As the α,β-ethylenically unsaturated polyvalent carboxylic acid, maleic acid, fumaric acid, itaconic acid, citraconic acid, etc., may be mentioned.

As the α,β-ethylenically unsaturated polyvalent carboxylic anhydride, maleic acid anhydride, etc. may be mentioned.

As the copolymerizable anti-aging agent, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc., may be mentioned.

A plurality of these other copolymerizable monomers may be used in combination. A content of these other monomer units in the nitrile rubber (A1) is preferably 80 wt % or less, more preferably 50 wt % or less and particularly preferably 10 wt % or less, per 100 wt % of the total monomer units.

The carboxyl group content in the nitrile rubber (A1) used in the first aspect, i.e. the number of carboxyl groups (number of moles) included in 100 g of the nitrile rubber (A1), is preferably $5 \times 10^{-4}$ to $5 \times 10^{-1}$ ephr, more preferably $1 \times 10^{-3}$ to $1 \times 10^{-1}$ ephr and particularly preferably $5 \times 10^{-3}$ to $6 \times 10^{-2}$ ephr. Too small content of carboxyl groups in the nitrile rubber (A1) may result in insufficient cross-link of the crosslinkable rubber composition; and too large content may result in lowering resistance to fatigue of the obtained cross-linked rubber.

The nitrile rubber (A1) has iodine value of 120 or less, preferably 100 or less, more preferably 80 or less, further preferably 25 or less and particularly preferably 15 or less. When the iodine value of the nitrile rubber (A1) is too large, ozone resistance of the obtained cross-linked rubber may be reduced.

Also, Mooney viscosity [$ML_{1+4}$ (100° C.)] of the nitrile rubber (A1) is preferably 15 to 200, more preferably 30 to 150 and particularly preferably 45 to 120. When the Mooney viscosity of the nitrile rubber (A1) is too low, mechanical strength of the obtained cross-linked rubber may be reduced; in contrast, too high viscosity may cause to reduce workability of the obtained crosslinkable rubber composition.

A production method of the above nitrile rubber (A1) is not particularly limited. Generally, a method to copolymerize α,β-ethylenically unsaturated nitrile monomer, α,β-ethylenically unsaturated dicarboxylic acid monoester monomer, diene-based monomer or α-olefin monomer and optionally-added other monomer copolymerizable with these is convenient and preferable. As a polymerization method, there may be used any known emulsion polymerization method, suspension polymerization method, bulk polymerization method and solution polymerization method, and because of easy control in polymerization reaction, etc., emulsion polymerization method is preferable.

When iodine value of the copolymer obtained by copolymerization is larger than the above range, hydrogenation of the copolymer (hydrogenation reaction) is recommended. The hydrogenation method is not particularly limited, and any known method may be employed.

Aromatic Secondary Amine-Based Antioxidant (A2)

The crosslinkable rubber composition according to the first aspect comprises an aromatic secondary amine-based anti-aging agent (A2) in addition to the above nitrile rubber (A1).

Although the aromatic secondary amine-based anti-aging agent (A2) is not particularly limited as far as it is an anti-aging agent having an aromatic secondary amine in its molecule, carbon number is preferably 100 or less and particularly preferably 50 or less. As the specific example, there may be mentioned a diaryl secondary monoamine-based anti-aging agent such as 4,4'-bis(α,α'-dimethylbenzil)diphenylamine (which may also be referred to as "p,p'-dicumyl diphenylamine") and octylated diphenylamine including p,p'-dioctyl diphenylamine, styrenated diphenylamine and phenyl-α-naphthylamine; a diaryl-p-phenylene diamine-based anti-aging agent such as diphenyl-p-phenylene diamine, mixed diaryl-p-phenylene diamine and dinaphthyl-p-phenylene diamine; and an alkylaryl-p-phenylene diamine-based anti-aging agent such as N-isopropyl-N'-phenyl-p-phenylene diamine, N-1,3-dimethylbutyl-N'-phenyl-p-phenylene diamine, N-(3-methacryloyloxy-2-hydroxypropyl)-N'-phenyl-p-phenylene diamine and N-(methacryloyl)-N'-phenyl-p-phenylene diamine.

A content of the aromatic secondary amine-based anti-aging agent (A2) in the crosslinkable rubber composition according to the first aspect is, with respect to 100 parts by weight of the nitrile rubber (A1), 0.2 to 10 parts by weight, preferably 0.3 to 8 parts by weight and more preferably 0.5 to 5 parts by weight. When the content of the (A2) component in the crosslinkable rubber composition is too small, it may be difficult to obtain the effects of the present invention (the invention according to the first aspect), and in contrast, too large content may cause to reduce mechanical strength.

Polyamine-Based Cross-Linking Agent (A3)

The crosslinkable rubber composition according to the first aspect further comprises a polyamine-based crosslinking agent (A3) as a crosslinking agent to cross-link the carboxyl groups of the above nitrile rubber (A1). The polyamine-based crosslinking agent (A3) is not particularly limited as far as it is (1) a compound having two or more amino groups, or (2) any one to be in the form of a compound having two or more amino groups when cross-linking. A compound wherein a plurality of hydrogens of an aliphatic hydrocarbon or aromatic hydrocarbon is substituted with an amino group or hydrazide structure (a structure expressed by "—CONHNH$_2$" where CO indicates a carbonyl group) is preferable. As a specific example of polyamine-based crosslinking agent (A3), aliphatic polyvalent amines such as hexamethylene diamine, hexamethylene diamine carbamate, tetramethylene pentamine, hexamethylene diamine cinnamaldehyde adduct and hexamethylene diamine-dibenzoate salt; aromatic polyvalent amines such as 2,2-bis[4-(4-aminophenoxy)phenyl]propane, 4,4'-methylene dianiline, m-phenylene diamine, p-phenylene diamine and 4,4'-methylene bis (o-chloroaniline); a compound having two or more hydrazide structures such as isophthalic acid dihydrazide, adipic acid dihydrazide and sebacic acid dihydrazide; may be mentioned. Among these, aliphatic polyvalent amines are preferable, and hexamethylene diamine carbamate is particularly preferable.

When using the other crosslinking agent such as a polyvalent epoxy compound, a polyvalent isocyanate compound, an aziridine compound, a basic metal oxide, an organometallic halide, an organic peroxide and the like instead of the polyamine-based crosslinking agent (A3), it is difficult to obtain effects of the present invention (the invention according to the first aspect).

A content of the polyamine-based crosslinking agent (A3) in the crosslinkable rubber composition according to the first aspect is 0.2 to 20 parts by weight, preferably 1 to 15 parts by weight and more preferably 1.5 to 10 parts by weight, with respect to 100 parts by weight of the nitrile rubber (A1). When the content of (A3) component in the crosslinkable rubber composition is too small, it may be difficult to obtain effects of the present invention (the invention according to the first aspect); in contrast, too large content may cause reduction in resistance to fatigue.

Other Compounding Agents, Cross-Linking Reaction of Crosslinkable Rubber Composition, etc.

In addition to the above nitrile rubber (A1), aromatic secondary amine-based anti-aging agent (A2) and polyamine-based crosslinking agent (A3), the crosslinkable rubber composition according to the first aspect may include a compounding agent normally used in the rubber processing field, e.g. a reinforcement filler such as carbon black and silica, a non-reinforcement filler such as calcium carbonate and clay, an anti-aging agent, a light stabilizer, an antiscorching agent such as a primary amine, a plasticizer, a processing aid, a lubricant, an adhesive, a lubricating agent, a flame-retardant, a fungicide, an antistatic agent, a coloring agent, a sulfur crosslinking agent, an organic peroxide crosslinking agent, a crosslinking accelerator, cross-linking auxiliaries, a cross-linking retardant, etc. Amounts of the compounding agents are not particularly limited as far as they are in the range not to disturb the purpose and effects of the present invention, and those suitable for the purpose of blending can be appropriately selected.

Also, the crosslinkable rubber composition according to the first aspect may include rubbers other than the nitrile rubber (A1) as far as the amounts are within the range not to disturb the purpose and effects of the present invention (the invention according to the first aspect). The content of the rubbers other than the nitrile rubber (A1) in the crosslinkable rubber composition according to the first aspect is preferably 30 wt % or less, more preferably 10 wt % or less and particularly preferably 5 wt % or less.

The crosslinkable rubber composition according to the first aspect is prepared by mixing each of the above components, normally in a nonaqueous condition. A method of preparing the crosslinkable rubber composition according to the first aspect is not limited, and normally, compounds excluding the crosslinking agent, cross-linking auxiliaries unstable to heat, etc., are primarily kneaded in a mixer such as a Bambury mixer, intermixer and kneader, and then secondarily kneaded after transferring it into a roll, etc. and adding the crosslinking agent, etc.

For cross-linking the prepared crosslinkable rubber composition to obtain the cross-linked rubber according to the first aspect, the prepared crosslinkable rubber composition is molded by using a molding machine suitable for a desired shape, e.g. an extruder, an injection molding machine, a compactor, a roll and the like, to fix a shape as a cross-linked rubber by cross-linking reaction. It may be cross-linked after molding or simultaneously. Molding temperature is normally 10 to 200° C., preferably 25 to 120° C. Cross-linking temperature is normally 100 to 200° C., preferably 130 to 190° C., and cross-linking time is normally 1 minute to 24 hours, preferably 2 minutes to 1 hour.

Also, depending on the shape, size, etc., of the cross-linked rubber, the inside may not be sufficiently cross-linked even if the surface is cross-linked, so that it may be secondarily cross-linked by further heating.

The cross-linked rubber according to the first aspect has characteristics that includes well-balanced mechanical strength, such as tensile strength and tensile stress, and elongation, and particularly small compression set, in addition to intrinsic properties of the nitrile group containing highly-saturated copolymer rubber such as excellent oil resistance, heat resistance and ozone resistance. Note that in the first aspect, compression set is preferably 71% or less in terms of "O-ring compression set" (a value of O-ring compression set after keeping it 25%-compressed at 150° C. for 504 hours) measured in "(8) O-ring set test" of the later-mentioned examples.

Therefore, such a cross-linked rubber according to the first aspect can be, based on the above properties, used in wide range of application including those subjected to a strong and repeating shear stress, including a variety of seals such as O-ring, packing, diaphragm, oil-seal, bearing seal and freon seal; a variety of belts such as conveyor belt, V belt, timing belt and synchronous belt; sealrubber components for oilfield such as barb and bubble sheet, BOP (Blow Out Preventer) and platter; attenuation rubber components such as cushioning material and vibration-absorption materials; a variety of hoses such as fuel hose, oil hose, marine hose, riser and flow line, and tubes; and a variety of rolls and roll covers such as printing roll, industrial roll and roll for business equipment; etc., as well as a variety of gaskets such as intake manifold gasket, locker cover gasket and oil pan gasket; boots; cable coatings; dust cover, automobile interior member, shoe sole, etc. It is used preferably for seal, belt, hose, tube, roll cover, gasket, boot and cable coatings, and particularly preferably for seal or belt.

Particularly, according to the first aspect, such effects, which mechanical strength, such as tensile strength and tensile stress is excellently balanced with elongation and compression set is reduced, are advantageous as the bulk rubber products except for fiber impregnated body and metal composite body.

Second Aspect

Second Embodiment

Next, a second embodiment, i.e. an embodiment according to the second aspect the present invention, will be described.

A crosslinkable rubber composition according to the second aspect of the present invention comprises 0.1 to 20 parts by weight of a primary monoamine (B2) having no polar group other than an amino group and 0.1 to 20 parts by weight of a polyamine-based crosslinking agent (B3) with respect to 100 parts by weight of a nitrile rubber (B1) including an $\alpha,\beta$-ethylenically unsaturated nitrile monomer unit and an $\alpha,\beta$-ethylenically unsaturated dicarboxylic acid monoester monomer unit and having iodine value of 120 or less.

Hereinafter, in the second aspect (second embodiment), the above nitrile rubber (B1) having an $\alpha,\beta$-ethylenically unsaturated dicarboxylic acid monoester monomer unit and iodine value of 120 or less may be abbreviated as "nitrile rubber (B1)".

Nitrile Rubber (B1)

As the nitrile rubber (B1), the same one as the above-mentioned nitrile rubber (A1) of the first aspect can be used.

Primary Monoamine (B2) Having No Polar Group Other than an Amino Group

The primary monoamine (B2) having no polar group other than an amino group [hereinafter it may be simply referred to as "primary monoamine (B2)".] included in the crosslinkable rubber composition according to the second aspect is a monoamine compound wherein a hydrocarbon residue and two hydrogen atoms are bound to a nitrogen atom and the hydrocarbon residue does not have a polar group such as other amino group, imino group, hydroxyl group, alkoxy group, carboxyl group, ester group, carbonyl group, formyl group, nitro group, nitrile group, halogen group. When the hydrocarbon residue has two or more amino groups, or a polar group other than an amino group, it is difficult to obtain effects of the present invention (invention according to the second aspect).

The hydrocarbon residue in the primary monoamine (B2) may be either aliphatic or aromatic, and aliphatic is preferable. Namely, as the primary monoamine (B2), an aliphatic primary monoamine is preferable, and more specifically, those having the carbon number of preferably 6 to 50, more preferably 8 to 30 and particularly preferably 8 to 20 are preferable. When carbon number of the hydrocarbon residue of the primary monoamine (B2) is too small, it may vaporize;

in contrast, when it is too large, mechanical strength of the obtained cross-linked rubber may be reduced.

Preferable specific examples of the primary monoamine (B2) may include nonadecylamine, octadecylamine, hexadecylamine, tridecylamine, decylamine and octylamine, and octadecylamine is particularly preferable.

A content of the primary monoamine (B2) in the crosslinkable rubber composition according to the second aspect is 0.1 to 20 parts by weight, preferably 0.2 to 5 parts by weight and more preferably 0.3 to 2 parts by weight with respect to 100 parts by weight of the nitrile rubber (B1). When the content of the primary monoamine (B2) component is too small in the crosslinkable rubber composition, workability and scorch stability may be deteriorated; in contrast, too large content may cause to reduce mechanical strength of the obtained cross-linked rubber.

Polyamine-Based Cross-Linking Agent (B3)

As the polyamine-based crosslinking agent (B3), the crosslinking agent same as the above-mentioned polyamine-based crosslinking agent (A3) of the first aspect can be used.

In the second aspect, a content of the polyamine-based crosslinking agent (B3) is 0.1 to 20 parts by weight, preferably 0.3 to 15 parts by weight and more preferably 0.5 to 10 parts by weight with respect to 100 parts by weight of the nitrile rubber (B1). When the content of the (B3) component is too small in the crosslinkable rubber composition, compression set tends to increase in the obtained cross-linked rubber. On the other hand, too large content may cause reduction in resistance to fatigue of the obtained cross-linked rubber.

Other Compounding Agent, Cross-Linking Reaction of Crosslinkable Rubber Composition, Etc.

The crosslinkable rubber composition according to the second aspect may arbitrarily include a compounding agent normally used in the rubber processing field in addition to the above nitrile rubber (B1), primary monoamine (B2) and polyamine-based crosslinking agent (B3). As the compounding agent, those same as in the above-mentioned first aspect can be used. Similarly, the crosslinkable rubber composition according to the second aspect may include rubbers other than the nitrile rubber (B1) as far as not disturbing purpose and effects of the present invention. The amounts may be same as in the above-mentioned first aspect.

The crosslinkable rubber composition according to the second aspect is prepared, as with the above-mentioned first aspect, by mixing each of the above components in a non-aqueous condition. Then, the prepared crosslinkable rubber composition is molded, cross-linked, and secondarily cross-linked if needed to obtain the cross-linked rubber according to the second aspect.

The cross-linked rubber according to the second aspect shows sufficient mechanical strength, such as tensile strength and tensile stress, and elongation, and particularly small compression set, in addition to the intrinsic properties of the nitrile group containing highly-saturated copolymer rubber such as excellent oil resistance, heat resistance and ozone resistance. Note that in the second aspect, compression set is preferably 70% or less, more preferably 60% or less, in terms of "O-ring compression set" (a value of O-ring compression set after keeping it 25%-compressed at 150° C. for 168 hours) measured in "(11) O-ring set test" of the later-mentioned examples.

Therefore, such a cross-linked rubber according to the second aspect can be, based on the above properties, preferably used in various applications, for example, in the same applications as in the above-mentioned first aspect.

Particularly, according to the second aspect, such effects, which mechanical strength, such as tensile strength and tensile stress, and elongation are sufficient, and compression set is reduced, are advantageous as the bulk rubber products except for fiber impregnated body and metal composite body.

Third Aspect

Third Embodiment

Next, a third embodiment, i.e. an embodiment according to the third aspect of the present invention, will be described.

A crosslinkable rubber composition according to the third aspect of the present invention comprises a nitrile group containing highly-saturated copolymer rubber (C1), a polyoxyalkylene alkyl ether phosphate ester (C2) and a polyamine-based crosslinking agent (C3).

Hereinafter, in the third aspect (third embodiment), the above nitrile group containing highly-saturated copolymer rubber (C1) may be abbreviated as "highly-saturated nitrile rubber (C1)".

Highly-Saturated Nitrile Rubber (C1)

A preferable mode to form a nitrile group of the highly-saturated nitrile rubber (C1) is the one in which the rubber has an $\alpha,\beta$-ethylenically unsaturated nitrile monomer unit.

As a monomer forming the $\alpha,\beta$-ethylenically unsaturated nitrile monomer unit, although not limited as far as it is an $\alpha,\beta$-ethylenically unsaturated compound having a nitrile group, for example, same monomers as in above-mentioned nitrile rubber (A1) of the first aspect can be used. Also, the content of the $\alpha,\beta$-ethylenically unsaturated nitrile monomer unit may be same as in the above-mentioned first aspect.

In the highly-saturated nitrile rubber (C1), a diene-based monomer unit or $\alpha$-olefin monomer unit is normally included so that the cross-linked rubber has rubber elasticity.

As a diene-based monomer and $\alpha$-olefin monomer forming the diene-based monomer unit and $\alpha$-olefin monomer unit, same monomers can be used as in the above-mentioned nitrile rubber (A1) of the first aspect. Also, the contents of these monomer units may be same as in the above-mentioned first aspect.

The highly-saturated nitrile rubber (C1) preferably contains a carboxyl group. When the highly-saturated nitrile rubber (C1) contains a carboxyl group, the obtained cross-linked rubber tends to improve tensile strength.

As a mode to contain a carboxyl group in the highly-saturated nitrile rubber (C1), the one in which molecular structure of the rubber has an $\alpha,\beta$-ethylenically unsaturated carboxylic acid monomer unit, an $\alpha,\beta$-ethylenically unsaturated dicarboxylic acid monoester monomer unit or an $\alpha,\beta$-ethylenically unsaturated dicarboxylic acid monomer unit is preferable, and the one having an $\alpha,\beta$-ethylenically unsaturated dicarboxylic acid monoester monomer unit is more preferable.

As a preferable method to contain an $\alpha,\beta$-ethylenically unsaturated dicarboxylic acid monoester monomer unit in the highly-saturated nitrile rubber (C1) which is the above-mentioned more preferable mode, there may be mentioned a method to copolymerize an $\alpha,\beta$-ethylenically unsaturated dicarboxylic acid monoester monomer with the above $\alpha,\beta$-ethylenically unsaturated nitrile monomer.

As an organic group, binding to a carbonyl group through an oxygen atom, in an ester structure of the $\alpha,\beta$-ethylenically unsaturated dicarboxylic acid monoester monomer, an alkyl group, a cycloalkyl group and an alkylcycloalkyl group may be mentioned, and among these, alkyl group is preferable. Carbon number of the alkyl group, consequently an alkoxy group, is preferably 3 to 8, more preferably 4 to 6. When carbon number is too small, processing stability of the crosslinkable rubber composition may be reduced; in contrast, too large carbon number may cause slowed cross-linking rate and lowered mechanical strength of the obtained cross-linked rubber.

As the above α,β-ethylenically unsaturated dicarboxylic acid monoester monomer, for example, same monomers as in the above-mentioned nitrile rubber (A1) of the first aspect can be used. Also, the content of the α,β-ethylenically unsaturated dicarboxylic acid monoester monomer unit may be same as in the above-mentioned first aspect.

The highly-saturated nitrile rubber (C1) may include other monomer unit copolymerizable with a monomer forming each of the above monomer units, i.e. the α,β-ethylenically unsaturated nitrile monomer, diene-based monomer or α-olefin monomer, and α,β-ethylenically unsaturated dicarboxylic acid monoester monomer. As the other monomer, for example, same monomers as in the above-mentioned nitrile rubber (A1) of the first aspect can be used. Also, the content of the other copolymerizable monomer unit may be same as in the above-mentioned first aspect.

It is preferable that the carboxy group content, iodine value and Mooney viscosity [$ML_{1+4}$ (100° C.)] of the highly-saturated nitrile rubber (C1) are within the same ranges as in the above-mentioned nitrile rubber (A1) of the first aspect. Also, highly-saturated nitrile rubber (C1) may be produced as with the above-mentioned nitrile rubber (A1) of the first aspect.

Polyoxyalkylene Alkyl Ether Phosphate Ester (C2)

The crosslinkable rubber composition according to the third aspect comprises a polyoxyalkylene alkyl ether phosphate ester (C2) in addition to the above-mentioned highly-saturated nitrile rubber (C1). The polyoxyalkylene alkyl ether phosphate ester (C2) is a phosphate monoester, diester or triester, containing a polyoxyalkylene alkyl ether group, and may be a mixture of these.

Among these, from viewpoint of improvement in heat aging resistance and reduction in compression set, the monoester having a chemical structure expressed by the following formula (I) is preferable.

[(Chemical Formula (1)]

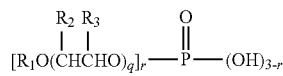

(1)

In this formula, $R_1$ is an alkyl group with carbon number of 1 to 30; each of $R_2$ and $R_3$ is independently a hydrogen or alkyl group with carbon number of 1 to 10; q is the number of moles of an added alkylene oxide and a natural number of 2 to 50; r is the number of the polyoxyalkylene alkyl ether group which is 1, 2 or 3. In the above formula, q and r are independently selected from the above ranges.

The polyoxyalkylene alkyl ether phosphate ester (C2) of the above formula (I) is those having alkyl group $R_1$ with carbon number of preferably 8 to 22, more preferably 10 to 20. Also preferably, each of $R_2$ and $R_3$ is independently a hydrogen or alkyl group with carbon number of 1 to 3, and more preferably a hydrogen or methyl group, and it is particularly preferable that both are hydrogen groups. The number of moles, q, of an added alkylene oxide is preferably 8 to 30, more preferably 10 to 20.

The content of the polyoxyalkylene alkyl ether phosphate ester (C2) in the crosslinkable rubber composition according to the third aspect is preferably 0.05 to 20 parts by weight, more preferably 0.1 to 10 parts by weight and particularly preferably 0.3 to 5 parts by weight with respect to 100 parts by weight of the highly-saturated nitrile rubber (C1). By making the content within the above range, effects of improvement in heat aging resistance and reduction in compression set are further significant.

Polyamine-Based Cross-Linking Agent (C3)

It is preferable that the crosslinkable rubber composition according to the third aspect includes a polyamine-based crosslinking agent (C3) as a crosslinking agent for forming a cross-linked rubber.

As the polyamine-based crosslinking agent (C3), same crosslinking agents as in the above-mentioned polyamine-based crosslinking agent (A3) of the first aspect can be used. Also, the content of the polyamine-based crosslinking agent (C3) is preferably 0.1 to 20 parts by weight, more preferably 0.2 to 15 parts by weight and particularly preferably 0.3 to 10 parts by weight with respect to 100 parts by weight of the highly-saturated nitrile rubber (C1). When the content of the polyamine-based crosslinking agent (C3) is too small, the obtained cross-linked rubber may be insufficient in cross-link, resulting in reduction in mechanical strength or increase in compression set; in contrast, too large content may cause reduction in elongation.

Note that in the third aspect, it is preferable to use the polyamine-based crosslinking agent (C3) as a crosslinking agent, but instead of the polyamine-based crosslinking agent (C3), there may be used another crosslinking agent such as an organic peroxide, a sulfur-based crosslinking agent, a resin crosslinking agent, a polyvalent epoxy compound, a polyvalent isocyanate compound, a polyvalent alcohol compound, an aziridine compound, a basic metal oxide and an organometallic halide.

As the organic peroxide, dialkyl peroxides, diacyl peroxides, peroxyesters may be mentioned.

As the dialkyl peroxides, there may be mentioned dicumyl peroxide, di-t-butylperoxide, 2,5-dimethyl-2,5-di(t-butylperoxy)-3-hexine, 2,5-dimethyl-2,5-di(t-butylperoxy)hexane, 1,3-bis (t-butylperoxyisopropyl)benzene, etc. As the diacyl peroxides, there may be mentioned benzoyl peroxide, isobutyryl peroxide, etc. As the peroxyesters, there may be mentioned 2,5-dimethyl-2,5-bis(benzoylperoxy)hexane, t-butylperoxyisopropyl carbonate, etc.

As the sulfur-based crosslinking agent, there may be mentioned a sulfur such as powdered sulfur and precipitated sulfur; and an organic sulfur compound such as 4,4'-dithiomorpholine, tetramethylthiuram disulfide, tetraethylthiuram disulfide and polymer polysulfide.

As the resin crosslinking agent, there may be mentioned alkylphenol-formaldehyde resin, melamine-formaldehyde condensate, triazine-formaldehyde condensate, octylphenol-formaldehyde resin, alkylphenol-sulfide resin, hexamethoxymethyl-melamine resin.

As the polyvalent epoxy compound, there may be mentioned a compound having two or more epoxy groups in a molecule, including a glycidyl ether-type epoxy compound such as a phenol novolac-type epoxy compound, a cresol novolac-type epoxy compound, a cresol-type epoxy compound, a bisphenol A type epoxy compound, a bisphenol F type epoxy compound, a brominated bisphenol A type epoxy compound, a brominated bisphenol F type epoxy compound and a hydrogenated bisphenol A type epoxy compound; a polyvalent epoxy compound such as an alicyclic epoxy compound, a glycidyl ester-type epoxy compound, a glycidyl amine-type epoxy compound and an isocyanurate-type epoxy compound; etc. These can be used alone or in combination of two or more.

As the polyvalent isocyanate compound, diisocyanates and triisocyanates, with carbon number 6 to 24, are preferable.

As a specific example of the diisocyanates, there may be mentioned 2,4-tolylenediisocyanate (2,4-TDI), 2,6-tolylenediisocyanate (2,6-TDI), 4,4'-diphenylmethane diisocyanate (MDI), hexamethylene diisocyanate, p-phenylene diisocyanate, m-phenylene diisocyanate, 1,5-naphthylene diisocyanate, etc. Also, as a specific example of triisocyanates, there may be mentioned 1,3,6-hexamethylene triisocyanate, 1,6,11-undecane triisocyanate, bicycloheptane triisocyanate, etc. These can be used alone or in combination of two or more.

As the polyvalent alcohol compound, there may be mentioned a low-molecular-weight polyol such as ethylene glycol, propylene glycol, butylene glycol, hexamethylene glycol, diethylene glycol, dipropylene glycol, triethylene glycol, polyethylene glycol, polyoxypropylene glycol, 1,7-heptanediol, 1,8-octanediol, hydrobenzoin, benzpinacol, cyclohexanedimethanol, glycerin, trimethylolethane, trimethylolpropane, pentaerythritol, dipentaerythritol, trimethylolethane, trimethylolhexane and bisphenol A; a polyol wherein an alkylene oxide is additively polymerized to a low-molecular-weight polyol such as diethylene glycol, dipropylene glycol, butanediol and glycerin; a polyol wherein an alkylene oxide is additively polymerized to a low-molecular-weight amine such as triethanolamine, ethylamine, propylamine, ethylenediamine, triethylenediamine and diethylenetriamine; a polysaccharides such as arbitol, sorbitol, sorbitan, xylose, arabinose, glucose, galactose, sorbose, fructose and sorbitan propylester; a polymer having a plurality of hydroxyl groups in a molecule such as polyglycerin ester, polyvinyl alcohol, a polyolefin-based oligomer having a plurality of hydroxyl groups and ethylene-hydroxyethyl(meth)acrylate copolymer; a cyclic compound having a plurality of hydroxyl groups such as a spiroglycol having a hydroxyl group terminally, a dioxane glycol having a hydroxyl group terminally, a tricyclodecane-dimethanol having a hydroxyl group terminally and a macromonomer having a hydroxyl group terminally and a polystyrene side-chain; etc. These can be used alone or in combination of two or more.

As the aziridine compound, there may be mentioned tris-2,4,6-(1-aziridinyl)-1,3,5-triazine, tris[1-(2-methyl)aziridinyl]phosphinoxide, hexa[1-(2-methyl)aziridinyl]triphosphatriazine, etc. These can be used alone or in combination of two or more.

As the basic metal oxide, there may be mentioned zinc oxide, lead oxide, calcium oxide, magnesium oxide, etc. These can be used alone or in combination of two or more.

As the organometallic halide, dicyclopentadienyl metal dihalide may be exemplified. The metal may include titanium, zirconium, hafnium, etc.

When using these crosslinking agents other than the polyamine-based crosslinking agent (C3), the content in the crosslinkable rubber composition may be same as in the case of using the polyamine-based crosslinking agent (C3).

Other Compounding Agent, Cross-Linking Reaction of Crosslinkable Rubber Composition, Etc.

The crosslinkable rubber composition according to the third aspect may arbitrarily include a compounding agent normally used in the rubber processing field in addition to each of the above-mentioned components. As the compounding agent, those same as in the above-mentioned first aspect can be used. Similarly, the crosslinkable rubber composition according to the third aspect may include rubbers other than the highly-saturated nitrile rubber (C1) as far as not disturbing purpose and effects of the present invention. The amounts may be same as in the above-mentioned first aspect.

The crosslinkable rubber composition according to the third aspect is prepared, as with the above-mentioned first aspect, by mixing each of the above components in a non-aqueous condition. Then, the prepared crosslinkable rubber composition is molded, cross-linked, and secondarily cross-linked if needed to obtain the cross-linked rubber according to the third aspect.

The cross-linked rubber according to the third aspect shows excellent heat aging resistance and significantly small compression set, in addition to the intrinsic properties of the nitrile group containing highly-saturated copolymer rubber such as excellent oil resistance and ozone resistance.

Therefore, such a cross-linked rubber according to the third aspect can be, based on the above properties, preferably used in various applications, for example, in the same applications as in the above-mentioned first aspect.

Particularly, according to the third aspect, such effects, which mechanical strength, such as tensile strength and tensile stress, is excellent and compression set is reduced, are advantageous as the bulk rubber products except for fiber impregnated body and metal composite body.

Fourth Aspect

Fourth Embodiment

Next, a fourth embodiment, i.e. an embodiment according to the fourth aspect of the present invention, will be described.

A crosslinkable rubber composition according to the fourth aspect of the present invention comprises, with respect to a total of 100 parts by weight of a nitrile group containing highly-saturated copolymer rubber (D1) having an $\alpha,\beta$-ethylenically unsaturated dicarboxylic acid monoester monomer unit and an acrylic rubber (D2) having an $\alpha,\beta$-ethylenically unsaturated dicarboxylic acid monoester monomer unit, 0.2 to 20 parts by weight of a polyamine-based crosslinking agent (D3).

Hereinafter, in the fourth aspect (fourth embodiment), the above nitrile group containing highly-saturated copolymer rubber (D1) and acrylic rubber (D2) having an $\alpha,\beta$-ethylenically unsaturated dicarboxylic acid monoester monomer unit may be abbreviated as "nitrile rubber (D1)" and "acrylic rubber (D2)", respectively.

Nitrile Rubber (D1)

A preferable mode to form a nitrile group of the nitrile rubber (D1) is the one in which the rubber has an $\alpha,\beta$-ethylenically unsaturated nitrile monomer unit.

As a monomer forming the $\alpha,\beta$-ethylenically unsaturated nitrile monomer unit, although not limited as far as it is an $\alpha,\beta$-ethylenically unsaturated compound having a nitrile group, for example, same monomers as in above-mentioned nitrile rubber (A1) of the first aspect can be used. Also, the content of the $\alpha,\beta$-ethylenically unsaturated nitrile monomer unit may be same as in the above-mentioned first aspect.

The nitrile rubber (D1) comprises an $\alpha,\beta$-ethylenically unsaturated dicarboxylic acid monoester monomer unit in addition to the $\alpha,\beta$-ethylenically unsaturated nitrile monomer unit. When the nitrile rubber (D1) contains an $\alpha,\beta$-ethylenically unsaturated dicarboxylic acid monoester monomer unit, the obtained cross-linked rubber tends to improve tensile strength.

As a preferable method to contain an $\alpha,\beta$-ethylenically unsaturated dicarboxylic acid monoester monomer unit in the nitrile rubber (D1), there may be mentioned a method to copolymerize an α,β-ethylenically unsaturated dicarboxylic acid monoester monomer with the above α,β-ethylenically unsaturated nitrile monomer.

As an organic group, binding to a carbonyl group through an oxygen atom, in an ester structure of the α,β-ethylenically unsaturated dicarboxylic acid monoester monomer, an alkyl group, cycloalkyl group and alkylcycloalkyl group are mentioned, and the alkyl group is preferable among these. Carbon number of the alkyl group, consequently an alkoxy group, is preferably 3 to 8, more preferably 4 to 6. When carbon number is too small, processing stability of the crosslinkable rubber composition may be reduced; in contrast, too large carbon number may cause slowed cross-linking rate and lowered mechanical strength of the obtained cross-linked rubber.

As the above α,β-ethylenically unsaturated dicarboxylic acid monoester monomer, for example, same monomers as in the above-mentioned nitrile rubber (A1) of the first aspect can be used. Also, the content of the α,β-ethylenically unsaturated dicarboxylic acid monoester monomer unit may be same as in the above-mentioned first aspect.

The nitrile rubber (D1) normally comprises a diene-based monomer unit and/or α-olefin monomer unit to allow the cross-linked rubber having rubber elasticity.

As a diene-based monomer and α-olefin monomer forming the diene-based monomer unit and α-olefin monomer unit respectively, same monomers can be used as in the above-mentioned nitrile rubber (A1) of the first aspect. Also, the contents of these monomer units may be same as in the above-mentioned first aspect.

The nitrile rubber (D1) may comprise other monomer units copolymerizable with the monomer forming each of the above monomer unit, i.e. α,β-ethylenically unsaturated nitrile monomer, α,β-ethylenically unsaturated dicarboxylic acid monoester monomer, and diene-based monomer or α-olefin monomer. As other monomers, for example, same monomers can be used as in the above-mentioned nitrile rubber (A1) of the first aspect. Also, the content of the other copolymerizable monomer unit may be same as in the above-mentioned first aspect.

It is preferable that the carboxyl group content, iodine value and Mooney viscosity [$ML_{1+4}$ (100° C.)] of the nitrile rubber (D1) are within the same ranges as in the above-mentioned nitrile rubber (A1) of the first aspect. Also, the nitrile rubber (D1) may be produced as with the above-mentioned nitrile rubber (A1) of the first aspect.

Acrylic Rubber (D2)

The acrylic rubber (D2) having an α,β-ethylenically unsaturated dicarboxylic acid monoester monomer unit used in the fourth aspect is a rubber containing an acrylic acid ester monomer unit which is a main component unit and an α,β-ethylenically unsaturated dicarboxylic acid monoester monomer unit.

A total amount of the acrylic acid ester monomer unit and α,β-ethylenically unsaturated dicarboxylic acid monoester monomer unit in the acrylic rubber (D2) is preferably 70 wt % or more, more preferably 80 wt % or more and particularly preferably 90 wt % or more, per 100 wt % of all monomer units.

Also, when the total amount of the acrylic acid ester monomer unit and α,β-ethylenically unsaturated dicarboxylic acid monoester monomer unit in the acrylic rubber (D2) is defined as 100 wt %, a ratio of the acrylic acid ester monomer unit is preferably 90 to 99.5 wt %, more preferably 95 to 99 wt %.

On the other hand, in the acrylic rubber (D2), when the total amount of the acrylic acid ester monomer unit and α,β-ethylenically unsaturated dicarboxylic acid monoester monomer unit is defined as 100 wt %, a ratio of the α,β-ethylenically unsaturated dicarboxylic acid monoester monomer unit is preferably 0.5 to 10 wt %, more preferably 1 to 5 wt %.

When the ratio of the acrylic acid ester monomer unit is too large, the effects of the present invention (the invention according to the fourth aspect) may not be obtained; in contrast, when the ratio of the acrylic acid ester monomer unit is too small, mechanical strength and elongation of the obtained cross-linked rubber may be reduced.

The carboxyl group content of the acrylic rubber (D2) used in the fourth aspect, i.e. the number of carboxyl groups (number of moles) per 100 g of the acrylic rubber (D2), is preferably $5 \times 10^{-4}$ to $5 \times 10^{-1}$ ephr, more preferably $1 \times 10^{-3}$ to $1 \times 10^{-1}$ ephr and particularly preferably $5 \times 10^{-3}$ to $6 \times 10^{-2}$ ephr. When the carboxyl group content of the acrylic rubber (D2) is too small, mechanical strength of the obtained cross-linked rubber may be reduced; in contrast, when it is too large, remaining carboxyl groups after cross-link may result in deterioration in resistance to fatigue of the obtained cross-linked rubber.

In the fourth aspect, the acrylic rubber (D2) is preferably:

(i) an acrylic rubber consisting of an acrylic acid alkyl ester monomer unit having an alkyl group with carbon number of 1 to 8 as the main component unit; or (ii) an acrylic rubber wherein an acrylic acid alkyl ester monomer unit having an alkyl group with carbon number of 1 to 8 and an acrylic acid alkoxyalkyl ester monomer unit having a sum of carbon numbers of an alkyl group and alkoxy group of 1 to 8 are used in combination as the main component unit.

As a monomer forming the above acrylic acid alkyl ester monomer unit having an alkyl group with carbon number of 1 to 8, an acrylic acid alkyl ester monomer having an alkyl group with carbon number of 1 to 4 is preferable, and for example, methyl acrylate, ethyl acrylate, propyl acrylate, n-butyl acrylate, etc., may be mentioned.

As a monomer forming the above acrylic acid alkoxyalkyl ester monomer unit having a sum of carbon numbers of an alkyl group and alkoxy group of 1 to 8, an acrylic acid alkoxyalkyl ester monomer having an alkyl group with carbon number of 1 to 4 and an alkoxy group with carbon number of 1 to 4 is preferable, and for example, methoxymethyl acrylate, methoxyethyl acrylate, ethoxyethyl acrylate, butoxyethyl acrylate, etc., may be mentioned.

As a monomer forming the α,β-ethylenically unsaturated dicarboxylic acid monoester monomer unit constituting the acrylic rubber (D2), the α,β-ethylenically unsaturated dicarboxylic acid monoester monomer used as a monomer forming the above-mentioned nitrile rubber (D1) may be used as well.

The acrylic rubber (D2) may contain, in addition to the acrylic acid ester monomer unit which is the main component unit and α,β-ethylenically unsaturated dicarboxylic acid monoester monomer unit, a crosslinkable monomer unit copolymerizable with these in a ratio of preferably 10 wt % or less, more preferably 5 wt % or less, per 100 wt % of all monomer units.

As the crosslinkable monomer, for example, an active chlorine group containing unsaturated monomer, an epoxy group containing monomer, a carboxyl group containing monomer, a diene-based monomer, etc., may be mentioned.

As the active chlorine group containing unsaturated monomer, there may be mentioned vinyl chloroacetate, vinylbenzyl chloride, allyl chloroacetate, vinyl chlorobutyrate, 2-chloroethyl acrylate, 3-chloropropyl acrylate, 4-chlorobutyl acrylate, 2-chloroethyl methacrylate, 2-chloroethyl vinyl ether, chloromethyl butenyl ketone, 1-chloro-2-butenyl acrylate, 5-chloromethyl-2-norbornene, 5-chloroacetoxymethyl-2-norbornene and 5-($\alpha,\beta$-dichloropropionylmethyl)-2-norbornene.

As the epoxy group containing monomer, there may be mentioned an unsaturated glycidyl ester such as glycidyl acrylate, glycidyl methacrylate, diglycidyl itaconate, butene tricarboxylic acid triglycidyl and p-styrene carboxylic acid glycidyl; an unsaturated glycidyl ether such as vinylglycidyl ether, allylglycidyl ether and methacryl glycidyl ether; etc.

As the carboxyl group containing monomer, there may be mentioned unsaturated carboxylic acid monomer other than $\alpha,\beta$-ethylenically unsaturated dicarboxylic acid monoester monomer, such as acrylic acid, methacrylic acid, itaconic acid, maleic acid, fumaric acid, 2-norbornene-5-carboxylic acid and maleic anhydride.

As the diene-based monomer, the diene-based monomer for forming the above-mentioned nitrile rubber (D1) may be used as well.

The acrylic rubber (D2) may further contain, in addition to the acrylic acid ester monomer, the $\alpha,\beta$-ethylenically unsaturated dicarboxylic acid monoester monomer and the crosslinkable monomer, other monomer units copolymerizable with these as far as not disturbing effects of the present invention. As the other monomers, an ethylenically unsaturated monomer, not including the above acrylic acid ester monomer, $\alpha,\beta$-ethylenically unsaturated dicarboxylic acid monoester monomer and crosslinkable monomer, may be exemplified.

Specific examples of such an ethylenically unsaturated monomer include ethylene, acrylonitrile, vinyl acetate, styrene, $\alpha$-methylstyrene, acrylamide, polyalkylene glycol acrylic acid ester, methacrylonitrile, etc. The content of the other monomer unit in the acrylic rubber (D2) is preferably 50 wt % or less, more preferably 40 wt % or less, further preferably 30 wt % or less and particularly preferably 10 wt % or less per 100 wt % of all monomer units.

Mooney viscosity [$ML_{1+4}$ (100° C.)] of the acrylic rubber (D2) is preferably 10 to 100, more preferably 15 to 80 and particularly preferably 20 to 60. When Mooney viscosity of the acrylic rubber (D2) is too low, strength property of the obtained cross-linked rubber may be reduced; in contrast, too high Mooney viscosity may cause reduction in workability of the crosslinkable rubber composition.

A production method of the acrylic rubber (D2) is not limited, and any general production method for an acrylic rubber may be applicable. For example, each of the above monomers can be copolymerized by using polymerization procedure such as emulsion polymerization, suspension polymerization, solution polymerization and bulk polymerization using a radical initiator including persulfate such as potassium persulfate and ammonium persulfate; organic peroxide such as cumene hydroperoxide; etc., to produce the acrylic rubber (D2). Batch polymerization may be applicable, or polymerization may be done by either continuously or intermittently adding one or more monomer components during it. Polymerization temperature is preferably 0 to 100° C., more preferably 2 to 80° C.

In the fourth aspect, weight ratio of the nitrile rubber (D1) and the acrylic rubber (D2) in the crosslinkable rubber composition is preferably 5/95 to 95/5, more preferably 10/90 to 90/10, further preferably 20/80 to 80/20 and particularly preferably 30/70 to 70/30. When the ratio of the acrylic rubber (D2) is too small, heat resistance of the obtained cross-linked rubber may be insufficient, and compression set of the cross-linked rubber (particularly a cross-linked article with space portion) may not be sufficiently small. In contrast, when it is too large, mechanical strength of the obtained cross-linked rubber may be reduced.

Polyamine-Based Cross-Linking Agent (D3)

As the polyamine-based crosslinking agent (D3), same crosslinking agents as in the above-mentioned polyamine-based crosslinking agent (A3) of the first aspect can be used.

In the fourth aspect, the content of the polyamine-based crosslinking agent (D3) is 0.2 to 20 parts by weight, preferably 0.5 to 15 parts by weight and more preferably 1 to 10 parts by weight with respect to a total of 100 parts by weight of the nitrile rubber (D1) and acrylic rubber (D2). When the content of the (D3) component in the crosslinkable rubber composition is too small, effects of the present invention (the invention according to the fourth aspect) may not be fully obtained. In contrast, when it is too large, storage stability of the crosslinkable rubber composition may be reduced, and the obtained cross-linked rubber may be brittle due to too high crosslink density.

Basic Cross-Linking Accelerator (D4)

It is preferable that the crosslinkable rubber composition according to the fourth aspect further contains the basic crosslinking accelerator (D4). As the basic crosslinking accelerator (D4), there may be mentioned a guanidine-based crosslinking accelerator such as tetramethylguanidine, tetraethylguanidine, diphenylguanidine, di-o-tolylguanidine, o-tolylbiguanide and di-o-tolylguanidine salt of dicatechol borate; an aldehydeamine-based crosslinking accelerator such as n-butylaldehyde aniline and acetaldehyde ammonia; etc. Among these, the guanidine-based crosslinking accelerator is preferable.

The amount of the basic crosslinking accelerator (D4) is preferably 0.5 to 10 parts by weight, more preferably 1 to 7.5 parts by weight and particularly preferably 1.5 to 5 parts by weight with respect to a total of 100 parts by weight of the nitrile rubber (D1) and acrylic rubber (D2). When the amount of the basic crosslinking accelerator (D4) is too small, crosslinking rate of the crosslinkable rubber composition may be slowed and crosslink density may be reduced. In contrast, when it is too large, too high cross-linking rate may cause scorch, resulting in deterioration in storage stability.

Other Compounding Agent, Cross-Linking Reaction of Crosslinkable Rubber Composition, Etc.

The crosslinkable rubber composition according to the fourth aspect may arbitrarily include a compounding agent normally used in the rubber processing field in addition to each of the above components. As the compounding agent, those same as in the above-mentioned first aspect [note that the one corresponding to the above (D4) component is excluded] may be used. Similarly, the crosslinkable rubber composition according to the fourth aspect may include rubbers other than the nitrile rubber (D1) and acrylic rubber (D2) as far as not disturbing the purpose and effects of the present invention. The amounts may be same as in the above-mentioned first aspect.

The crosslinkable rubber composition according to the fourth aspect is prepared, as with the above-mentioned first aspect, by mixing each of the above components in a non-aqueous condition. Then, the prepared crosslinkable rubber composition is molded, cross-linked, and secondarily cross-linked if needed to obtain the cross-linked rubber according to the fourth aspect.

The cross-linked rubber according to the fourth aspect shows significantly small compression set as well as excellent mechanical strength and heat resistance. Note that compression set of the cross-linked rubber according to the fourth aspect is preferably 40% or less, more preferably 35% or less, in terms of "O-ring compression set" (a value of O-ring compression set after keeping it 25%-compressed at 150° C. for 168 hours) measured in "(11) O-ring set test" of the later-mentioned examples.

Therefore, such a cross-linked rubber according to the fourth aspect can be, based on the above properties, preferably used in various applications, for example, in the same applications as in the above-mentioned first aspect.

Particularly, according to the fourth aspect, when using it as seal material, such effects, which mechanical strength and heat resistance are excellent as well as significantly small compression set, are remarkable.

EXAMPLES

Hereinafter, the present invention will be specifically described based on production examples, inventive examples and comparative examples, but the present invention is not limited to these examples. Note that "parts" in the following description indicates a weight base unless otherwise designated.

Examples and Comparative Examples According to the First Aspect

First, production examples (production examples 1-1 and 1-2), examples (examples 1-1 to 1-5) according to the first aspect and comparative examples (comparative examples 1-1 to 1-7) will be described. Note that in the examples and comparative examples according to the first aspect, each of the following tests (1) to (8) and evaluation.

(1) Content of Carboxyl Groups

The content of carboxyl groups in the nitrile rubber was determined as the number of carboxyl groups (number of moles, unit is ephr) per 100 g of the rubber by titration at room temperature using a hydrous ethanol solution (0.02 N) of potassium hydroxide and thymolphtalein as an indicator.

(2) Iodine Value

Iodine value was measured according to JIS K6235.

(3) Mooney Viscosity [$ML_{1+4}$ (100° C.)]

Mooney viscosities of the nitrile rubber (polymer Mooney) and the crosslinkable rubber composition (compound Mooney) were measured according to JIS K6300.

(4) Normal Physical Property (Tensile Strength and Elongation)

The crosslinkable rubber composition was cross-linked at 170° C. for 20 minutes at a pressure of 10 MPa to prepare a pressed cross-linked test specimen. Tensile strength and elongation of the cross-linked rubber were measured according to JIS K6251 by using this pressed cross-linked test specimen.

(5) Normal Physical Property (100% Tensile Stress)

100% tensile stress of the cross-linked rubber was measured according to JIS K6251 under the same conditions as above (4).

(6) Normal Physical Property (Tensile Strength and Elongation) after Secondary Cross-Link The crosslinkable rubber composition was cross-linked at 170° C. for 20 minutes at a pressure of 10 MPa, followed by secondary cross-link in a geared oven at 170° C. for 4 hours, to prepare a test specimen. Tensile strength, 100% tensile stress and elongation of the cross-linked rubber after secondary cross-link were measured according to JIS K6251 by using this test specimen.

(7) Normal Physical Property (100% Tensile Stress) after Secondary Cross-Link

100% tensile stress of the cross-linked rubber after secondary cross-link was measured according to JIS K6251 under the same conditions as above (6).

(8) O-ring Set Test (150° C., 504 Hours)

By using a mold with an internal diameter of 30 mm and a ring diameter of 3 mm, the crosslinkable rubber composition was cross-linked at 170° C. for 20 minutes at a pressure of 10 MPa, followed by secondary cross-link at 170° C. for 4 hours, to obtain a test specimen for O-ring set test. Then, O-ring compression set was measured according to JIS K6262 under a condition of compressing a distance of two planes sandwiching an O-ring by 25% in a ring thickness direction at 150° C. for 504 hours.

Production Example 1-1

180 parts of ion-exchanged water, 25 parts of sodium dodecylbenzenesulfonate (emulsifier) solution in a concentration of 10 wt %, 37 parts of acrylonitrile, 8 parts of mono-n-butyl fumarate and 0.5 part of t-dodecylmercaptan (molecular weight modifier) was placed in sequence into a metallic bottle. After replacing the gas in the bottle with nitrogen three times, 55 parts of 1,3-butadiene was added. 0.1 part of Cumene hydroperoxide (polymerization catalyst) was added to the metallic bottle kept at 5° C., followed by polymerization reaction for 16 hours while rotating the metallic bottle. Then, after 0.1 part of hydroquinone (polymerization terminator) solution in a concentration of 10 wt % was added to terminate the polymerization reaction, remaining monomers were removed by using a rotary evaporator with water temperature of 60° C. to obtain a latex (solid content concentration of about 30 wt %) of an acrylonitrile-butadiene-α,β-ethylenically unsaturated dicarboxylic acid monoalkyl ester copolymer rubber comprising 34 wt % of acrylonitrile units, 59 wt % of butadiene units and 7 wt % of mono-n-butyl fumarate units.

To an autoclave, the above-produced latex and palladium catalyst (a mixed solution of equivalent weights of ion-exchanged water and acetone solution of 1 wt % palladium acetate) were added so as to have palladium content of 1000 ppm to dry weight of the rubber included in the obtained latex, followed by performing hydrogenation reaction at hydrogen pressure of 3 MPa at a temperature of 50° C. for 6 hours, so that a nitrile group containing highly-saturated copolymer rubber latex was obtained.

The obtained nitrile group containing highly-saturated copolymer rubber latex was added with twice volume of methanol. After solidification, the nitrile group containing highly-saturated copolymer rubber was vacuum-dried at 60° C. for 12 hours to obtain a nitrile rubber (A1-1). Iodine value of the nitrile rubber (A1-1) was 10, the carboxyl group content was $4.2 \times 10^{-2}$ ephr, and Mooney viscosity [$ML_{1+4}$ (100° C.)] was 48.

Production Example 1-2

Except for not using mono-n-butyl fumarate, and with using 37 parts of acrylonitrile and 63 parts of butadiene, a latex of an acrylonitrile-butadiene copolymer rubber, comprising 37 wt % of acrylonitrile units and 63 wt % of butadiene units, was obtained by the same procedures as in the production example 1-1. Then, as for the obtained rubber, hydrogenation reaction was carried out as with the production example 1-1 to prepare a nitrile rubber (A1'-2). Iodine value of the nitrile rubber (A1'-2) was 10, and Mooney viscosity [$ML_{1+4}$ (100° C.)] was 65.

Example 1-1

By using a Bambury mixer, 100 parts of the nitrile rubber (A1-1), 1 part of stearic acid, 40 parts of FEF carbon black (Asahi 60 manufactured by Asahi Carbon Co., Ltd.), 5 parts of plasticizer (ADEKA CIZER C-8 manufactured by Asahi Denka Company Limited) and 2 parts of N-isopropyl-N'-phenyl-p-phenylene diamine (NOCRAC 810NA manufactured by Ouchi Shinko Chemical Industrial, an aromatic secondary amine-based anti-aging agent (A2-1)) were mixed. Then, the obtained mixture was transferred to a roll and added with 2 parts of 1,3-di-o-tolylguanidine (NOCCELER DT manufactured by Ouchi Shinko Chemical Industrial, a crosslinking accelerator) and 3.4 parts of hexamethylene diamine carbamate (Diak#1 manufactured by DuPont Dow Elastomers L.L.C., a polyamine-based crosslinking agent (A3-1)) to knead, so that a crosslinkable rubber composition with compound Mooney viscosity of 96 was prepared.

The cross-linked rubber obtained by cross-linking the above prepared crosslinkable rubber composition was subject to each test and evaluation of normal physical properties, properties after secondary cross-link and O-ring set test (150° C., 504 hours). The results are shown in Table 1.

Examples 1-2 to 1-4

Except for using each anti-aging agent shown in Table 1 instead of N-isopropyl-N'-phenyl-p-phenylene diamine (A2-1), a crosslinkable rubber composition was respectively prepared by the same procedures as in the example 1-1.

Namely, in the example 1-2, octylated diphenylamine [NOCRAC AD-F manufactured by Ouchi Shinko Chemical Industrial, an aromatic secondary amine-based anti-aging agent (A2-2)], in the example 1-3, 4,4'-bis($\alpha$,$\alpha$'-dimethylbenzil)diphenylamine [NOCRAC CD manufactured by Ouchi Shinko Chemical Industrial, an aromatic secondary amine-based anti-aging agent (A2-3)], and in the example 1-4, styrenated diphenylamine [NONFLEX LAS manufactured by Seiko Chemical Co., Ltd., an aromatic secondary amine-based anti-aging agent (A2-4)]
were respectively used.

Example 1-5

As shown in Table 1, except for using 8.6 parts of 2,2-bis[4-(4-aminophenoxy)phenyl]propane [BAPP manufactured by Wakayama Seika Kogyo Co., Ltd., a polyamine-based crosslinking agent (A3-2)] as a crosslinking agent instead of hexamethylene diamine carbamate (A3-1), a crosslinkable rubber composition was prepared by the same procedures as in the example 1-1.

Comparative Example 1-1

Except for not using N-isopropyl-N'-phenyl-p-phenylene diamine (A2-1) as an anti-aging agent, a crosslinkable rubber composition was prepared by the same procedures as in the example 1-1.

Comparative Examples 1-2 to 1-5

Except for using each anti-aging agent shown in Table 1 instead of N-isopropyl-N'-phenyl-p-phenylene diamine (A2-1) as an anti-aging agent, each crosslinkable rubber composition was prepared by the same procedures as in the example 1-1.

Namely, in the comparative example 1-2, 2,2,4-trimethyl-1,2-dihydroquinoline [NOCRAC 224 manufactured by Ouchi Shinko Chemical Industrial, (A2'-5)], in the comparative example 1-3, 2-mercaptobenzimidazole [NOCRAC MB manufactured by Ouchi Shinko Chemical Industrial, (A2'-6)], in the comparative example 1-4, tris(nonylphenyl)phosphite [NOCRAC TNP manufactured by Ouchi Shinko Chemical Industrial, (A2'-7)], and in the comparative example 1-5, 4,4'-thio bis(3-methyl-6-t-butylphenol) [NOCRAC 300 manufactured by Ouchi Shinko Chemical Industrial, (A2'-8)]
were respectively used.

Comparative Examples 1-6

Except for adding 8 parts of 1,3-bis(t-butylperoxyisopropyl)benzene [Vulcup 40KE manufactured by Hercules Inc., (A3'-3)] instead of hexamethylene diamine carbamate (A3-1) as a crosslinking agent, and not adding 3-di-o-tolylguanidine, a crosslinkable rubber composition was prepared by the same procedures as in the example 1-1.

Comparative Example 1-7

Except for using the above produced nitrile rubber (A1'-2) instead of the nitrile rubber (A1-1), a crosslinkable rubber composition was prepared by the same procedures as in the example 1-1.

TABLE 1

| | | | Examples | | | | | Comparative Examples | |
|---|---|---|---|---|---|---|---|---|---|
| | | | 1-1 | 1-2 | 1-3 | 1-4 | 1-5 | 1-1 | 1-2 |
| Included | Nitrile rubber | | | | (A1-1) | | | (A1-1) | |
| | Antioxidant | | (A2-1) | (A2-2) | (A2-3) | (A2-4) | (A2-1) | — | (A2'-5) |
| | Cross-linking agent | | | | (A3-1) | | (A3-2) | (A3-1) | |
| Test/ Evaluation | Compound Mooney viscosity [ML$_{1+4}$, 100° C.] | | 96 | 93 | 96 | 100 | 84 | 101 | 98 |
| | Normal physical properties | Tensile strength | (MPa) | 20.9 | 18.9 | 18.8 | 20.3 | 18.6 | 19.2 | 19.2 |
| | | Elongation | (%) | 210 | 200 | 190 | 200 | 240 | 210 | 200 |
| | | 100% tensile stress | (MPa) | 9.0 | 8.1 | 9.1 | 9.4 | 9.2 | 8.5 | 8.8 |
| | Properties after secondary cross-link | Tensile strength | (MPa) | 21.7 | 21.1 | 21.9 | 21.8 | 21.8 | 21.3 | 20.4 |
| | | Elongation | (%) | 180 | 170 | 170 | 170 | 210 | 170 | 160 |
| | | 100% tensile stress | (MPa) | 11.1 | 11.1 | 11.4 | 11.9 | 9.1 | 11.4 | 11.2 |
| | | O-ring compression set | (%) | 67 | 70 | 68 | 68 | 69 | 81 | 77 |

TABLE 1-continued (150° C., 504 hours)

|  |  |  |  | Comparative Examples | | | | |
|---|---|---|---|---|---|---|---|---|
|  |  |  |  | 1-3 | 1-4 | 1-5 | 1-6 | 1-7 |
| Included | Nitrile rubber |  |  |  | (A1-1) | | | (A1'-2) |
|  | Antioxidant |  |  | (A2'-6) | (A2'-7) | (A2'-8) | (A2-1) | (A2-1) |
|  | Cross-linking agent |  |  |  | (A3-1) | | (A3'-3) | (A3-1) |
| Test/ | Compound Mooney |  |  | 97 | 97 | 101 | 77 | 85 |
| Evaluation | viscosity [$ML_{1+4}$, 100° C.] |  |  |  |  |  |  |  |
|  | Normal physical properties | Tensile strength | (MPa) | 21.5 | 19.5 | 20.1 | 21.5 | unvulcanized |
|  |  | Elongation | (%) | 210 | 210 | 210 | 340 |  |
|  |  | 100% tensile stress | (MPa) | 8.7 | 7.8 | 8.5 | 5.8 |  |
|  | Properties after secondary cross-link | Tensile strength | (MPa) | 20.7 | 19.8 | 19.9 | 21.0 |  |
|  |  | Elongation | (%) | 180 | 160 | 160 | 290 |  |
|  |  | 100% tensile stress | (MPa) | 10.7 | 11.2 | 11.5 | 6.2 |  |
|  | O-ring compression set (150° C., 504 hours) |  | (%) | 88 | 76 | 79 | 100 |  |

(NOTE)
(A2-1): N-isopropyl-N'-phenyl-p-phenylene diamine (NOCRAC 810NA manufactured by Ouchi Shinko Chemical Industrial)
(A2-2): octylated diphenylamine (NOCRAC AD-F manufactured by Ouchi Shinko Chemical Industrial)
(A2-3): 4,4'-bis(α,α'-dimethylbenzil)diphenylamine (NOCRAC CD manufactured by Ouchi Shinko Chemical Industrial)
(A2-4): styrenated diphenylamine (NONFLEX LAS manufactured by Seiko Chemical Co., Ltd.)
(A2'-5): 2,2,4-trimethyl-1,2-dihydroquinoline (NOCRAC 224 manufactured by Ouchi Shinko Chemical Industrial)
(A2'-6): 2-mercaptobenzimidazole (NOCRAC MB manufactured by Ouchi Shinko Chemical Industrial)
(A2'-7): tris (nonyl phenyl)phosphite (NOCRAC TNP manufactured by Ouchi Shinko Chemical Industrial)
(A2'-8): 4,4'-thiobis(3-methyl-6-t-butylphenol (NOCRAC 300 manufactured by Ouchi Shinko Chemical Industrial)
(A3-1): hexamethylene diamine carbamate (Diak#1 manufactured by DuPont Dow Elastomers L.L.C.)
(A3-2): 2,2-bis[4-(4-aminophenoxy)phenyl]propane (BAPP manufactured by Wakayama Seika Kogyo Co., Ltd.)
(A3'-3): 1,3-bis(t-butylperoxyisopropyl)benzene (Vulcup 40KE manufactured by Hercules Inc.)

Evaluation of Examples and Comparative Examples According to the First Aspect

As shown in Table 1, any crosslinkable rubber composition, comprising the nitrile rubber (A1-1) including acrylonitrile monomer unit and mono-n-butyl fumarate monomer unit and having iodine value of 10, any one of aromatic secondary amine-based anti-aging agents (A2-1) to (A2-4) and any one of polyamine-based crosslinking agents (A3-1) and (A3-2), is easy to handle since the compound Mooney viscosity is as low as 120 or less; is well-balanced in mechanical strength, such as tensile strength and tensile stress, and elongation; and has particularly small O-ring compression set (70% or less) (examples 1-1 to 1-5).

On the other hand, (i) when not adding an anti-aging agent to the nitrile rubber (A1-1); alternatively adding quinoline derivative based (A2'-5), sulfur compound based (A2'-6), phosphorus compound based (A2'-7), or polyphenol derivative based (A2'-8) anti-aging agent and cross-linking by the polyamine-based crosslinking agent (A3-1) (comparative examples 1-1 to 1-5), and (ii) when using aromatic secondary amine-based anti-aging agent (A2-1) to the nitrile rubber (A1-1) and organic peroxide based crosslinking agent (A3'-3) (comparative example 1-6), all of the obtained cross-linked rubbers showed large O-ring compression set (76% or more), so that compression set was deteriorated.

Also, some cases showed excellent mechanical strength but ill-balanced to elongation (comparative examples 1-2, 1-4 and 1-5); others showed enormously-lowered 100% tensile stress (comparative example 1-6). The comparative examples 1-1 and 1-3 were well-balanced in mechanical strength and elongation but further deteriorated in compression set.

Further, it was impossible to cross-link the rubber composition obtained by using the nitrile rubber (A1'-2), not satisfying requirements of the nitrile rubber (A1) in the present invention, even when using the aromatic secondary amine-based anti-aging agent (A2-1) and polyamine-based crosslinking agent (A3-1) (comparative example 1-7).

Examples and Comparative Examples According to the Second Aspect

Next, examples according to the second aspect (examples 2-1 to 2-2) and comparative examples (comparative examples 2-1 to 2-4) will be described. Note that in the examples and comparative examples according to the second aspect, each of the tests (1) to (4) and evaluation, as in the above first aspect, and each of the following tests (9) to (11) and evaluation were carried out.

(9) Mooney Scorch Test

From a result of measurement according to JIS K6300-1 at a temperature of 125° C. by using an L-shaped rotor, Mooney scorch time t5 (minute) and a lowest value Vmin of Mooney viscosity [$ML_{1+4}$ (100° C.)] were obtained. The larger t5 (minute) results in the superior scorch stability. Also, it is considered that the lower Vmin results in the superior workability at molding.

(10) Normal Physical Property (Hardness)

The crosslinkable rubber composition was cross-linked at 170° C. for 20 minutes at a pressure of 10 MPa to produce a pressed cross-linked test specimen. After secondary cross-link at 170° C. for 4 hours, hardness of the obtained cross-linked rubber was measured according to JIS K6253 by using a durometer hardness tester type A.

(11) O-ring Set Test (150° C., 168 Hours)

By using a mold with an internal diameter of 30 mm and a ring diameter of 3 mm, the crosslinkable rubber composition was cross-linked at 170° C. for 20 minutes at a pressure of 10 MPa, followed by secondary cross-link at 170° C. for 4 hours to obtain a test specimen for O-ring set test. Then, O-ring compression set was measured according to JIS K6262 under a condition of compressing a distance of two planes sandwiching an O-ring by 25% in a ring thickness direction at 150° C. for 168 hours.

Example 2-1

First, a nitrile rubber (B1-1) was prepared by the same production method employed for the nitrile rubber (A1-1) in the above production example 1-1.

Next, by using a Bambury mixer, 100 parts of nitrile rubber (B1-1), 1 part of stearic acid, 40 parts of carbon black (N550 by Tokai Carbon Co., Ltd.), 0.5 part of octadecylamine (Farmin 80 by Kao Chemical Company, a primary monoamine having no polar group other than an amino group), 5 parts of trimellitic acid ester (ADEKA CIZER C-8, a plasticizer manufactured by Asahi Denka Company Limited), 1.5 parts of 4,4'-di-(α,α'-dimethylbenzil)diphenylamine (Naugard 445 manufactured by Uniroyal Inc., an anti-aging agent) and 1.5 parts of 2-mercaptobenzimidazole (NOCRAC MB manufactured by Ouchi Shinko Chemical Industrial, an anti-aging agent) were mixed. Then, the obtained mixture was transferred to a roll and added with 2 parts of 1,3-di-o-tolylguanidine (NOCCELER DT manufactured by Ouchi Shinko Chemical Industrial, a crosslinking accelerator) and 3 parts of hexamethylene diamine carbamate (Diak#1 manufactured by DuPont Dow Elastomers L.L.C., a polyamine-based crosslinking agent) to knead, so that a crosslinkable rubber composition with compound Mooney viscosity of 92 was prepared.

In addition to Mooney scorch test of the above prepared crosslinkable rubber composition, each test and evaluation of normal physical property and O-ring set test (150° C., 168 hours) of the cross-linked rubber obtained by cross-linking the crosslinkable rubber composition was carried out. The results are shown in Table 2.

Example 2-2 and Comparative Example 2-1

Except for changing an amount of octadecylamine from 0.5 part in example 2-1 into 1 part (example 2-2), or zero (comparative example 2-1), a crosslinkable rubber composition was respectively prepared by the same procedures as in the example 2-1 as well as same tests and evaluations. The results are shown in Table 2.

Comparative Examples 2-2 and 2-3

Except for using 2 parts of dialkylamine (Armeen 2C by Lion Akzo Co., Ltd., 8 to 18 of carbon number of an alkyl group) (comparative example 2-2), or 1 part of n-butyl aldehyde aniline (comparative example 2-3) instead of using 0.5 parts of octadecylamine as in the example 2-1, a crosslinkable rubber composition was respectively prepared by the same procedures as in the example 2-1 as well as same tests and evaluations. The results are shown in Table 2.

Comparative Example 2-4

First, a nitrile rubber (B1'-2), produced by the same method as with nitrile rubber (A1'-2) in the above production example 1-2, was prepared.

Then, a crosslinkable rubber composition was respectively prepared by the same procedures as in the example 2-1 as well as same tests and evaluations, except for using 100 parts of nitrile rubber (B1'-2) instead of 100 parts of nitrile rubber (B1-1); and for peroxide cross-link instead of that between carboxyl groups, further using 12 parts of 1,3-bis (t-butylperoxyisopropyl)benzene (Vulcup 40KE manufactured by Hercules Inc., concentration 40 wt %) instead of 3 parts of hexamethylene diamine carbamate and 4 parts of N,N-m-phenylenedimaleimide (HVA-2 manufactured by DuPont Dow Elastomers L.L.C.) instead of 2 parts of 1,3-di-o-tolylguanidine as a crosslinking accelerator. The results are shown in Table 2.

TABLE 2

|  |  |  | Examples | | Comparative Examples | | | |
|---|---|---|---|---|---|---|---|---|
|  |  |  | 2-1 | 2-2 | 2-1 | 2-2 | 2-3 | 2-4 |
| Included (parts) | nitrile rubber (B1-1) |  | 100 | 100 | 100 | 100 | 100 | — |
|  | nitrile rubber (B1'-2) |  | — | — | — | — | — | 100 |
|  | octadecylamine |  | 0.5 | 1 | — | — | — | 0.5 |
|  | dialkylamine |  | — | — | — | 2 | — | — |
|  | n-butyl aldehyde aniline |  | — | — | — | — | 1 | — |
|  | hexamethylene diamine carbamate |  | 3 | 3 | 3 | 3 | 3 | — |
|  | 1,3-di-o-tolylguanidine |  | 2 | 2 | 2 | 2 | 2 | — |
|  | 1,3-bis(t-butyl peroxy isopropyl)benzene (40 wt %) |  | — | — | — | — | — | 12 |
|  | N,N-m-phenylenedimaleimide |  | — | — | — | — | — | 4 |
| Compound Mooney viscosity |  | [$ML_{1+4}$, 100° C.] | 92 | 87 | 117 | 114 | 111 | 87 |
| Mooney scorch | t5 | (min) | 8.7 | 9.9 | 7.5 | 7.9 | 7.8 | 19.5 |
|  | Vmin | [$ML_{1+4}$, 100° C.] | 52 | 48 | 77 | 80 | 75 | 48 |
| Normal physical properties | Tensile strength | (MPa) | 18.2 | 17.8 | 19.1 | 16.8 | 18.3 | 26.0 |
|  | Elongation | (%) | 170 | 170 | 160 | 150 | 150 | 75 |
|  | Hardness | (Duro A) | 73 | 73 | 73 | 73 | 74 | 75 |
| O-ring compression set (150° C., 168 hours) |  | % | 56 | 55 | 52 | 56 | 55 | 77 |

Evaluation of Examples and Comparative Examples According to the Second Aspect

As shown in Table 2, the crosslinkable rubber compositions containing the nitrile rubber (B1-1) including an acrylonitrile unit and a mono-n-butyl fumarate unit and having iodine value of 10, and primary monoamine (B2) and polyamine-based crosslinking agent (B3) predefined in the present invention (invention according to the second aspect) can all provide a cross-linked rubber (examples 2-1 and 2-2), low in compound Mooney viscosity as low as 100 or less; sufficiently long in scorch time t5; easy to handle because of low Vmin; as well as showing sufficient tensile strength and elongation, and small O-ring compression set as low as 60% or less.

On the other hand, the crosslinkable rubber composition not containing the primary monoamine (B2) predefined in the present invention (invention according to the second aspect) and the crosslinkable rubber composition containing a dialkylamine or a mono amine having polar group instead of the primary monoamine (B2) predefined in the present invention (invention according to the second aspect) result in high compound Mooney viscosity and Vmin, short scorch time t5, and inferior workability (comparative examples 2-1 to 2-3). Even when blending the primary monoamine (B2) and polyamine-based crosslinking agent (B3) predefined in the present invention (invention according to the second aspect), the use of peroxide as a crosslinking agent to nitrile rubber having no carboxyl group results in the obtained cross-linked rubbers with increased O-ring compression set (comparative examples 2-4).

Examples and Comparative Examples According to the Third Aspect

Next, a production example (production example 3-1), examples (examples 3-1 to 3-2) according to the third aspect and comparative examples (comparative examples 3-1 to 3-4) will be described. Note that in the examples and comparative examples according to the third aspect, each of the tests (1) to (3) and (6) and evaluation as in the above first aspect, and each of the following tests (12) to (15) and evaluation were carried out.

(12) Roll Adherence Property

Roll adherence property was evaluated in 6 standards in which 4 steps were added between the following two standards based on the conditions during the roll-kneading operation to:

0: shows intense roll adherence property and is impossible to be kneaded;

5: shows no roll adherence property and is easy to be kneaded.

(13) Normal Physical Property (Hardness) after Secondary Cross-Link

The crosslinkable rubber composition was placed in a mold with a length of 15 cm, a width of 15 cm and a depth of 0.2 cm, cross-linked at 170° C. for 20 minutes at a pressure of 10 MPa followed by secondary cross-link in a gear oven at 170° C. for 4 hours to produce a test specimen. In accordance with JIS K6253, hardness of the cross-linked rubber after the secondary cross-link was measured by using a durometer hardness tester type A.

(14) O-ring Set Test (170° C., 70 Hours)

By using a mold with an internal diameter of 30 mm, a ring diameter of 3 mm and a depth of 3 mm, the crosslinkable rubber composition was cross-linked at 170° C. for 20 minutes at a pressure of 10 MPa, followed by secondary cross-link at 170° C. for 4 hours to obtain a test specimen for O-ring set test. Then, O-ring compression set was measured according to JIS K6262 under a condition of compressing a distance of two planes sandwiching an O-ring by 25% in a ring thickness direction at 170° C. for 70 hours.

(15) Heat Aging Resistance Test (170° C., 168 Hours)

As for the test specimen obtained by primary and secondary cross-link as in the above (13), tensile strength and its rate of change (%) as well as elongation and its rate of change (%) were measured after keeping it at 170° C. for 168 hours according to JIS K6257 (normal oven method).

Production Example 3-1

Except for changing amounts of t-dodecylmercaptan (molecular weight modifier) from 0.5 part to 0.7 part, and of Cumene hydroperoxide (polymerization catalyst) from 0.1 part to 0.06 part, was obtained as with the production example 1-1, a latex (solid content concentration of about 25 wt %) of an acrylonitrile-butadiene-α,β-ethylenically unsaturated dicarboxylic monoalkyl ester copolymer rubber containing 35 wt % of acrylonitrile unit, 57.8 wt % of butadiene unit and 7.2 wt % of mono-n-butyl fumarate unit.

Next, the obtained rubber was subject to hydrogenation reaction as in the production example 1-1, so that a highly-saturated nitrile rubber (C1-1) was obtained. Iodine value of the highly-saturated nitrile rubber (C1-1) was 7, carboxyl group content was $4.2 \times 10^{-2}$ ephr, and Mooney viscosity [$ML_{1+4}$ (100° C.)] was 50.

Example 3-1

By using a Bambury mixer, 100 parts of the highly-saturated nitrile rubber (C1-1) was added with 1 part of polyoxyethylene alkyl ether phosphate ester (product name: "Phosphanol RL-210" manufactured by TOHO Chemical Industry Co., Ltd.; including 41.6 wt % of monoesters, 38.4 wt % of diesters and about 20 wt % of polyoxyethylene alkyl ethers), 1.5 parts of 4,4'-di-(α,α'-dimethylbenzil)diphenylamine (Naugard 445 manufactured by Uniroyal Inc., an anti-aging agent) and 40 parts of FEF carbon black (Asahi 60 manufactured by Asahi Carbon Co., Ltd., a reinforcing filler) and mixed. Next, the obtained mixture was transferred to a roll and 2 parts of 3-di-o-tolylguanidine (NOCCELER DT manufactured by Ouchi Shinko Chemical Industrial, a crosslinking accelerator) and 3.4 parts of hexamethylene diamine carbamate [Diak#1 manufactured by DuPont Dow Elastomers L.L.C., a polyamine-based crosslinking agent] were added and kneaded to prepare a crosslinkable rubber composition.

Each test and evaluation was performed for roll adherence property at preparation of the above prepared crosslinkable rubber composition, normal physical property of the cross-linked rubber obtained by cross-linking of the crosslinkable rubber composition, O-ring set test (170° C., 70 hours) and heat aging resistance (170° C., 168 hours). The results are shown in Table 3.

Example 3-2

Except for replacing 1 part of polyoxyethylene alkyl ether phosphate ester with 1 part of polyoxyethylene octadecylether phosphate ester (product name "VAMFRE VAM" manufactured by R.T. Vanderbilt Company Inc.), a crosslinkable rubber composition was obtained by the same procedures as in the example 3-1 as well as same tests and evaluations. The results are shown in Table 3.

Comparative Example 3-1

Except for not adding polyoxyethylene alkyl ether phosphate ester, a crosslinkable rubber composition was obtained by the same procedures as in the example 3-1 as well as same tests and evaluations. The results are shown in Table 3.

Comparative Examples 3-2 to 3-4

Except for replacing 1 part of polyoxyethylene alkyl ether phosphate ester in the example 3-1 with 1 part each of stearic acid (comparative example 3-2), fatty acid ester (comparative example 3-3) or phosphoric acid tri(2-ethylhexyl) ester (comparative example 3-4), a crosslinkable rubber composition was respectively obtained by the same procedures as in the example 3-1. Note that as the fatty acid ester (comparative example 3-3), product name "Structol WB222" manufactured by Structol Company; and as the phosphoric acid tri(2- ethylhexyl)ester (comparative example 3-4), product name "TOP" manufactured by Daihachi Chemical Industry Co., Ltd.; were respectively used.

Each of the above obtained crosslinkable rubber composition was subject to same tests and evaluation as in the example 3-1. The results are shown in Table 3.

10 MPa, followed by secondary cross-link in a gear oven at 170° C. for 4 hours to produce a test specimen. The produced test specimen was kept at 150° C. for 504 hours according to JIS K6257 (normal oven method), and then, tensile strength and its rate of change (%) as well as elongation and its rate of change (%) were measured.

TABLE 3

|  |  |  |  | Examples | | Comparative Examples | | | |
|---|---|---|---|---|---|---|---|---|---|
|  |  |  |  | 3-1 | 3-2 | 3-1 | 3-2 | 3-3 | 3-4 |
| Included (parts) | Phosphanol RL-210 | *1 |  | 1 | — | — | — | — | — |
|  | VAMFRE VAM | *2 |  | — | 1 | — | — | — | — |
|  | stearic acid |  |  | — | — | — | 1 | — | — |
|  | Structol WB222 (fatty acid ester) | *3 |  | — | — | — | — | 1 | — |
|  | phosphoric acid tri(2-ethylhexyl)ester |  |  | — | — | — | — | — | 1 |
| Test results | Roll adherence property |  |  | 5 | 5 | 2 | 4 | 3 | 2 |
|  | Normal physical properties | Tensile strength | (MPa) | 21.6 | 21.0 | 21.0 | 21.7 | 21.5 | 22.0 |
|  |  | Elongation | (%) | 150 | 140 | 140 | 150 | 140 | 160 |
|  |  | Hardness | (Duro A) | 78 | 78 | 79 | 78 | 78 | 77 |
|  | O-ring set test (170° C., 70 hours) |  | (%) | 33 | 32 | 44 | 42 | 45 | 43 |
|  | Heat aging resistance | Tensile strength – change of rate | (%) | +6 | +8 | −34 | −41 | −39 | −16 |
|  |  | Elongation – change of rate | (%) | −24 | −18 | −50 | −56 | −52 | −41 |
|  |  | Hardness – degree of change |  | +4 | +4 | +6 | −7 | +7 | +6 |

*1: product of TOHO Chemical Industry Co., Ltd.
*2: product of R. T. Vanderbilt Company Inc.
*3: product of Structol Company Evaluation of Examples and Comparative Examples According to the Third Aspect As shown in Table 3, the predefined crosslinkable rubber composition of the present invention (invention according to the third aspect) are all small in roll adherence property and easy to handle, good in tensile strength, elongation and hardness of the cross-linked rubber, and significantly small in O-ring compression set as low as 35% or less; and in addition, they can provide cross-linked rubbers excellent in heat aging resistance (examples 3-1 and 3-2).

On the other hand, when not adding polyoxyethylene alkyl ether phosphate ester, or replacing polyoxyethylene alkyl ether phosphate ester with 1 part each of stearic acid, fatty acid ester or phosphoric acid tri(2-ethylhexyl)ester, the crosslinkable rubber compositions are all strong in roll adherence property and bad in kneading workability. Also, the obtained cross-linked rubbers are all large in O-ring compression set, resulting in inferior heat aging resistance (comparative examples 3-1 to 3-4).

Examples and Comparative Examples According to the Fourth Aspect

Next, production examples (production examples 4-1 to 4-2), examples (example 4-1 to 4-3) according to the fourth aspect and comparative examples (comparative examples 4-1 to 4-3) will be described. Note that in the examples and comparative examples according to the fourth aspect, the following test (16) and evaluation were carried out in addition to each of the tests (1) to (3) and (6) and evaluation in the above first aspect, and the test (11) and evaluation of the above second aspect.

(16) Heat Aging Resistance Test (150° C., 504 Hours)

The crosslinkable rubber composition was placed in a mold with a length of 15 cm, a width of 15 cm and a depth of 0.2 cm, cross-linked at 170° C. for 20 minutes at a pressure of Production Example 4-1

200 parts of ion-exchanged water, 3 parts of sodium lauryl sulfate (emulsifier), 70 parts of ethyl acrylate, 28 parts of n-butyl acrylate and 2 parts of monomethyl maleate were added into a polymerization reactor equipped with a thermometer and a stirring device, and after repeating deaerating decompression and nitrogen substitution twice to sufficiently remove oxygen, 0.005 part of cumene hydroperoxide and 0.002 part of sodium formaldehyde sulfoxylate were added to initiate emulsion polymerization at a normal pressure at a temperature of 30° C. The reaction was continued until polymerization conversion ratio reached 95%. The obtained emulsion polymerization solution was solidified with a calcium chloride solution, followed by dewatering, water washing and drying, to obtain an acrylic rubber (D2-1).

The composition of the acrylic rubber (D2-1) was 70 wt % of ethyl acrylate unit, 28 wt % of n-butyl acrylate unit and 2 wt % of monomethyl maleate unit (carboxyl group content of $1.3 \times 10^{-2}$ ephr); and Mooney viscosity [$ML_{1+4}$ (100° C.)] was 45.

Production Example 4-2

Except for changing amounts of ethyl acrylate and n-butyl acrylate added into the polymerization reactor from 70 parts to 30 parts and from 28 parts to 35 parts respectively, and replacing 2 parts of monomethyl maleate with 33 parts of 2-methoxyethyl acrylate and 2 parts of methacrylic acid, an acrylic rubber (D2'-2) was obtained as with the production example 4-1. The composition of the acrylic rubber (D2'-2) was 30 wt % of ethyl acrylate, 35 wt % of n-butyl acrylate, 33 wt % of 2-methoxyethyl acrylate and 2 wt % of methacrylic acid; and Mooney viscosity [$ML_{1+4}$, (100° C.)] was 35.

Example 4-1

First, a nitrile rubber (D1-1), produced by the same method as with the nitrile rubber (A1-1) in the above production example 1-1, was prepared.

Then, by using a Bambury mixer, 75 parts of the nitrile rubber (D1-1) and 25 parts of the above produced acrylic rubber (D2-1) were added with 1 part of stearic acid, 40 parts of FEF carbon black (Asahi 60 manufactured by Asahi Carbon Co., Ltd.), 5 parts of a plasticizer (ADEKA CIZER C-8 manufactured by Asahi Denka Company Limited), 0.5 part of an organic acid resin complex-based lubricant (Moldwiz 21G manufactured by Tomoe Engineering Co., Ltd.), 1 part of ester-based wax (GREG G8205 manufactured by Dainippon Ink and Chemicals, Incorporated), 1.5 parts of an amine-based anti-aging agent (Naugard 445 manufactured by Uniroyal Inc.) and 1.5 parts of 2-mercaptobenzimidazole (NOCRAC MB manufactured by Ouchi Shinko Chemical Industrial, an anti-aging agent) and mixed. Then, the obtained mixture was transferred to a roll and added with 2 parts of 1,3-di-o-tolylguanidine (NOCCELER DT manufactured by Ouchi Shinko Chemical Industrial, a basic crosslinking accelerator) and 2.7 parts of hexamethylene diamine carbamate (Diak#1 manufactured by DuPont Dow Elastomers L.L.C., a polyamine-based crosslinking agent) to knead, so that a crosslinkable rubber composition with compound Mooney viscosity of 72 was obtained.

The cross-linked rubber obtained by cross-linking the above prepared crosslinkable rubber composition was subject to each test and evaluation of properties after secondary cross-link, heat aging resistance (150° C., 504 hours) and O-ring set test (150° C., 168 hours). The results are shown in Table 4.

Examples 4-2 and 4-3, and Comparative Example 4-1

Except for changing a compounding ratio of the nitrile rubber (D1-1) and acrylic rubber (D2-1) and an amount of hexamethylene diamine carbamate to those shown in Table 4, a crosslinkable rubber composition was respectively obtained by the same procedures as in the example 4-1 as well as same tests and evaluations. The results are shown in Table 4.

Comparative Example 4-2

Except for changing an amount of the nitrile rubber (D1-1) from 75 parts to 50 parts, replacing 25 parts of acrylic rubber (D2-1) with 50 parts of acrylic rubber (D2'-2), and changing an amount of the hexamethylene diamine carbamate from 2.7 parts to 2.1 parts, a crosslinkable rubber composition was obtained by the same procedures as in the example 4-1 as well as same tests and evaluations. The results are shown in Table 4.

Comparative Example 4-3

Except for changing amounts of the nitrile rubber (D1-1) and acrylic rubber (D2-1) to 50 parts, and replacing 1,3-di-o-tolylguanidine and hexamethylene diamine carbamate with 8 parts of 1,3-bis(t-butylperoxyisopropyl)benzene of 40% product (Vulcup 40KE by GEO Specialty Chemicals Inc., an organic peroxide) (3.2 parts in terms of pure organic peroxide), a crosslinkable rubber composition was obtained by the same procedures as in the example 4-1 as well as same tests and evaluations. The results are shown in Table 4.

TABLE 4

| | | | Examples | | | Comparative Examples | | |
|---|---|---|---|---|---|---|---|---|
| | | | 4-1 | 4-2 | 4-3 | 4-1 | 4-2 | 4-3 |
| Included (parts) | rubber (D1-1) | | 75 | 50 | 25 | 100 | 50 | 50 |
| | rubber (D2-1) | | 25 | 50 | 75 | — | — | 50 |
| | rubber (D2'-2) | | — | — | — | — | 50 | — |
| | hexamethylene diamine carbamate | | 2.7 | 2.1 | 1.4 | 3.4 | 2.1 | — |
| | 1,3-bis(t-butyl peroxy isopropyl)benzene (40 wt %) | | — | — | — | — | — | 8 |
| Compound | Mooney viscosity | [$ML_{1+4}$, 100° C.] | 72 | 57 | 43 | 92 | 60 | 52 |
| Properties after secondary cross-link | Tensile strength | (MPa) | 17.4 | 13.4 | 11.0 | 20.1 | 14.6 | 16.2 |
| | Elongation | (%) | 190 | 180 | 180 | 190 | 230 | 240 |
| Heat aging test | Tensile strength | (MPa) | 15.7 | 14.3 | 10.9 | 15.4 | 13.8 | 15.0 |
| | Elongation | (%) | 110 | 120 | 140 | 90 | 120 | 160 |
| | Tensile strength – change of rate | (%) | −10 | 7 | −1 | −23 | −5 | −7 |
| | Elongation – change of rate | (%) | −42 | −33 | −22 | −53 | −48 | −33 |
| O-ring compression set (150° C., 168 hours) | | (%) | 36 | 30 | 23 | 44 | 70 | 78 |

Evaluation of Examples and Comparative Examples According to the Fourth Aspect

As shown in Table 4, the predefined crosslinkable rubber compositions of the present invention (invention according to the fourth aspect) are all low in compound Mooney viscosity as low as 80 or less and easy to handle, and can provide a cross-linked rubber with sufficiently large tensile strength as high as 10 MPa or more; no particular troubles in heat aging test except for reduction in elongation; and significantly small O-ring compression set as low as 40% or less (examples 4-1 to 4-3).

On the other hand, the use of the nitrile rubber (D1-1) as an only rubber results in reduced elongation in heat aging test and increased compression set (comparative example 4-1). Also, when mixing the nitrile rubber (D1-1) and acrylic rubber (D2-1) by 50 parts/50 parts, the rubber composition using an organic peroxide as a crosslinking agent results in large O-ring compression set as high as 70% or more (comparative example 4-3).

Also, even when using the acrylic rubber (D2'-2) containing an α,β-ethylenically unsaturated mono carboxylic acid monomer unit but no α,β-ethylenically unsaturated dicarboxylic acid monoester monomer unit as an acrylic rubber, the cross-linked rubber of the rubber composition shows large O-ring compression set which is 70% (comparative example 4-2).

The invention claimed is:

1. A crosslinkable rubber composition comprising a nitrile group containing highly-saturated copolymer rubber, a polyoxyalkylene alkyl ether phosphate ester and a polyamine-based crosslinking agent.

2. The crosslinkable rubber composition as set forth in claim 1, wherein said nitrile group containing highly-saturated copolymer rubber is a nitrile rubber in which a content of α,β-ethylenically unsaturated nitrile monomer units is 10 to 60 wt % and iodine value is 100 or less.

3. A cross-linked rubber obtained by cross-linking a crosslinkable rubber composition comprising a nitrile group containing highly-saturated copolymer rubber, a polyoxyalkylene alkyl ether phosphate ester, and a polyamine-based cross-linking agent.

4. The cross-linked rubber as set forth in claim 3, which is a seal material.

5. The cross-linked rubber as set forth in claim 3, which is a belt material.

* * * * *